(12) United States Patent
Bohannon et al.

(10) Patent No.: US 8,438,059 B2
(45) Date of Patent: May 7, 2013

(54) DYNAMIC E-MAIL

(75) Inventors: James John Bohannon, Pleasanton, CA (US); Robert B. Bushman, San Francisco, CA (US)

(73) Assignee: Mypoints.com Inc., San Francisco, CA (US)

( * ) Notice: Subject to any disclaimer, the term of this patent is extended or adjusted under 35 U.S.C. 154(b) by 558 days.

(21) Appl. No.: 12/695,775

(22) Filed: Jan. 28, 2010

(65) Prior Publication Data

US 2011/0184793 A1    Jul. 28, 2011

(51) Int. Cl.
*G06Q 30/00* (2012.01)
(52) U.S. Cl.
USPC ..................................... 705/14.41; 705/14.49
(58) Field of Classification Search ................ 705/14.41, 705/14.49, 14
See application file for complete search history.

(56) References Cited

U.S. PATENT DOCUMENTS

| | | | |
|---|---|---|---|
| 6,385,642 B1 | 5/2002 | Chlan et al. | |
| 7,725,502 B1 * | 5/2010 | Badros et al. | 705/14.73 |
| 2004/0249709 A1 * | 12/2004 | Donovan et al. | 705/14 |
| 2007/0244977 A1 * | 10/2007 | Atkins | 709/206 |
| 2009/0080946 A1 | 3/2009 | Mitsunobu | |

OTHER PUBLICATIONS

Animating GIFs for the Web. (using the GIFBuilder 0.4 animation software)(Product Support)(Brief Article) by Lynda Weinman; MacUser, v12, n11, p. 126(2); Nov. 1996.*
Create Effective Web Animations: How to design your GIF banner ads so that they're quick to download and visually exciting. (Internet/Web/Online Service Information) by Luisa Simone; PC Magazine, p. 176; Dec. 14, 1999.*

* cited by examiner

*Primary Examiner* — John Weiss
*Assistant Examiner* — Michael Stibley
(74) *Attorney, Agent, or Firm* — Marshall, Gerstein & Borun LLP

(57) ABSTRACT

A system may present dynamic content to an e-mail recipient in the form of an image implementing frame-sequence animation. Each frame may present an offer to the recipient. Upon selection of an offer, the system may determine which offer the recipient selected by determining which frame was displayed when the recipient responded. The e-mail may include an image URI specifying a frame-sequence animation image. The image URI may include an identifier, which may allow the system to determine when the recipient opened the e-mail message, and a link URI, which may also include the identifier. When the recipient indicates a response to an offer, the system may associate the link URI with the image URI and may determine to which offer the recipient was responding.

49 Claims, 16 Drawing Sheets

DYNAMIC E-MAIL

TECHNICAL FIELD

The following disclosure relates to systems and methods for implementing dynamic content using frame-sequence animation and, in particular, for implementing dynamic content using frame-sequence animation in e-mail messages.

BACKGROUND

Users of the World Wide Web distributed computing environment may freely send and retrieve data across long distances and between remote computing devices. The Web, implemented on the Internet, presents users with documents called "web pages" that may contain information as well as "hyperlinks" which allow the users to select and connect to related web sites. The web pages may be stored on remote computing devices, or servers, as hypertext-encoded files. The servers use Hyper Text Transfer Protocol (HTTP), or other protocols to transfer the encoded files to client users. Many users may remotely access the web sites stored on network-connected computing devices from a personal computer (PC) through a browser application running on the PC.

The browser application may act as an interface between user PCs and remote computing devices and may allow the user to view or access data that may reside on any remote computing device connected to the PC through the World Wide Web and browser interface. Typically, the local user PC and the remote computing device may represent a client and a server, respectively. Further, the local user PC or client may access Web data without knowing the source of the data or its physical location and publication of Web data may be accomplished by simply assigning to data a Uniform Resource Identifier (URI) that refers to the local file. To a local client, the Web may appear as a single, coherent data delivery and publishing system in which individual differences between other clients or servers may be hidden.

A system may provide web site proprietors with web site user demographics information and is generally described in U.S. application Ser. No. 09/080,946, "DEMOGRAPHIC INFORMATION GATHERING AND INCENTIVE AWARD SYSTEM AND METHOD" to Bistriceanu et al., the entire disclosure of which is hereby incorporated by reference. Generally, the system may include users, web site proprietors, and an enterprise system hosting a central web site. The users may register with the central web site and may earn "points" for performing specific on- or off-line tasks in exchange for disclosing their demographic information during registration. The users may then redeem their earned points at participating proprietors for merchandise or services. Generally, the central web site manages the system by performing a number of tasks including: maintaining all user demographic information, tracking user point totals, and awarding points according to specific, proprietor-defined rules. Proprietors may effectively market their products or services to specific users based on the provided demographic information.

In a demographic information gathering and incentive award system, marketers may desire to use e-mail messages to reach a minimum number of potential customers during a bulk e-mail campaign or test. E-mail is an effective means of sending advertisements to consumers and other users.

However, the use of e-mail messages as a medium is not without its limitations relative to advertising using web pages. Because most e-mail viewing clients, such as web clients including Yahoo Mail and Gmail, and non-web clients such as Microsoft Outlook, prohibit JavaScript or plug-ins from executing within the context of viewing an e-mail message, many of the techniques used to enrich and personalize the user experience in a web page are not typically possible in the context of an e-mail message. An e-mail message may be formatted in the form of an HTML e-mail, which may include images (including animated images) arranged in a two-dimensional layout along with text of various fonts and colors. The e-mail message may also include one or more links (each link having as an attribute a "URI") which, upon clicking, take the user to some destination on the World Wide Web. A person viewing the e-mail message may activate the links by clicking on text and/or by clicking on an image within the e-mail message.

Aside from the restriction of JavaScript and plug-ins, there is the additional limitation that the HTML content of an e-mail message is static (i.e., it does not change after transmission from the e-mail server). This may limit the effectiveness of an advertising campaign employing e-mail messages, for example, where the e-mail message is time-limited (e.g., where a particular advertisement or offer expires). In particular, it is commonly known that when displaying one offer or promotion near the top of the e-mail message (which is the first part typically viewed by a user), and displaying another offer or promotion near the bottom of the e-mail message, a viewer of the e-mail message is far more likely to respond to the offer near the top. Thus, the ability to present different offers (e.g., in rotation or dynamically selected based on criteria that may vary after composition, transmission, and delivery of the e-mail message) near the top of the e-mail message may improve the effectiveness of the e-mail message. While JavaScript or plug-ins would make this type of enhancement easy in the context of a web page, this is not usually possible in the context of an e-mail message.

SUMMARY

Methods are described for sending dynamic e-mail content to a recipient and receiving a response from the recipient. In some embodiments, the method includes transmitting an e-mail message to the recipient. The e-mail message includes a first uniform resource identifier (URI) for specifying to an e-mail client associated with the recipient a location from which to request an image to display within the e-mail message and a second URI for specifying to either the e-mail client or a browser client associated with the recipient a location from which to request data when the recipient selects the image displayed within the e-mail message. The method also includes receiving from the e-mail client a first request for the image specified by the first URI, and interpreting the received first request to determine a plurality of frames to transmit as an image in a multi-frame image format in response to the first request. The image is transmitted to the e-mail client and the e-mail client displays the plurality of frames to the recipient. The method further includes receiving a second request for data associated with the second URI and indicating that the recipient selected the image, determining one of the plurality of frames that was displayed to the recipient when the recipient selected the image to cause the second request, and performing an action in response to the determination of the one of the plurality of frames displayed to the recipient when the recipient selected the image.

In some embodiments, the identifier may be associated with one or both of the recipient and a marketing campaign, and interpreting the identifier includes determining the one or both of the recipient and the marketing campaign. The identifier may be an encrypted value in some embodiments.

In some embodiments, transmitting the image includes transmitting an indication that the server is sending a plurality of frames and transmitting the plurality of frames. The plurality of frames may be transmitted in the form of an animated GIF file and each of the frames may be displayed for a known period of time and in a known sequence. In some embodiments, frames may be transmitted twice with no delay, or a first portion of a subsequent frame may be transmitted with no intervening delay. The plurality of frames may, in some embodiments, be transmitted through a first connection that remains open.

Various other embodiments, incorporating one or more of these elements and/or other elements, are described below with references to the included drawings.

DETAILED DESCRIPTION

Figure 1:
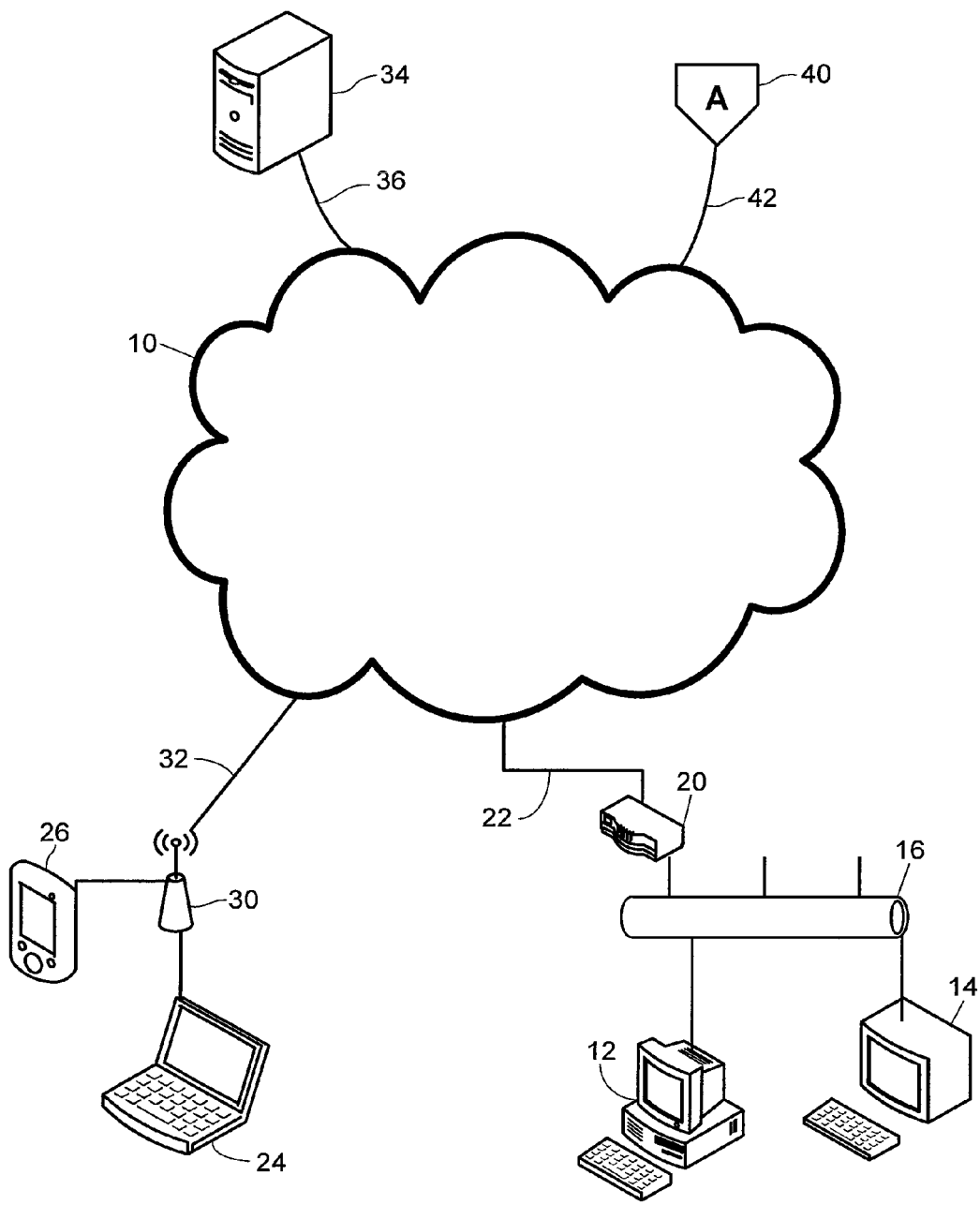
FIG. 1 depicts a diagram of one example of a network and network devices.

FIG. 1 illustrates an example of a network typical of the World Wide Web. A network 10 may be a virtual private network (VPN), or any other network that allows one or more computers, communication devices, databases, etc., to be communicatively connected to each other. The network 10 may be connected to a personal computer (PC) 12 and a computer terminal 14 via an Ethernet 16 and a router 20, and a land line 22. The network 10 may also be wirelessly connected to a laptop computer 24 and a personal data assistant and/or smart phone 26 via a wireless communication station 30 and a wireless link 32. Similarly, a server 34 may be connected to the network 10 using a communication link 36. Also, an enterprise system 40 for awarding points to registered users in exchange for demographic information, as generally illustrated in FIGS. 3, 5, 7, and 8, may be connected to the network 10 using another communication link 42. Where the network 10 includes the Internet, data communication may take place over the network 10 via an Internet communication protocol. In operation, the client PC 12 may view or request data from any other computing device connected to the network 10. Further, the PC 12 may send data to any other computing device connected to the network 10.

Figure 2:
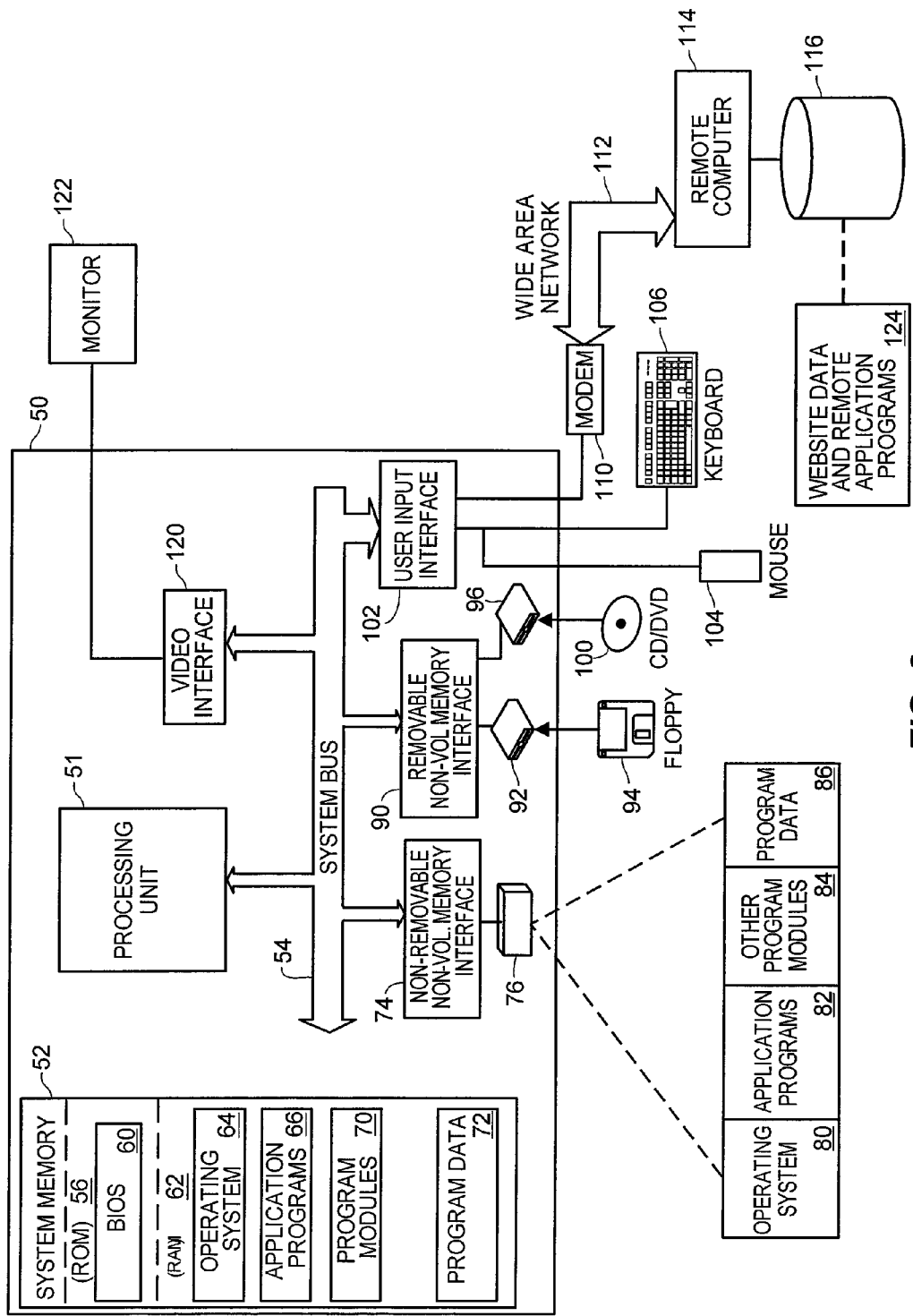
FIG. 2 depicts a diagram of one example of a general computing device that may cooperate with the network depicted in FIG. 1.

FIG. 2 illustrates a typical computing device (i.e., a computer) 50 that may be connected to the network 10 of FIG. 1 and participate in a distributed computing environment such as the World Wide Web. FIG. 2 may also be an example of an appropriate computing system on which the claimed apparatus and claims may be implemented, however, FIG. 2 is only one example of a suitable computing system and is not intended to limit the scope or function of any claim. The claims are operational with many other general or special purpose computing devices such as PCs 12, server computers 34, portable computing devices such as a laptop 24, consumer electronics (e.g., personal digital assistants and smart phones) 26, mainframe computers, or distributed computing environments that include any of the above or similar systems or devices.

With reference to FIG. 2, a system for implementing the presently described apparatus may include several general computing devices in the form of the computer 50. The computer 50 may include a processing unit, 51, a system memory 52, and a system bus 54 that couples various system components including the system memory 52 to the processing unit 51. The system bus 54 may include an Industry Standard Architecture (ISA) bus, a Micro Channel Architecture (MCA) bus, Enhanced ISA (EISA) bus, Video Electronics Standards Association (VESA) local bus, a Peripheral Component Interconnect (PCI) bus or a Mezzanine bus, and the Peripheral Component Interconnect Express (PCI-E) bus.

The computer 50 typically includes a variety of computer readable media. Computer readable media can be any available media that accessible by the computer 50 and includes both volatile and nonvolatile media, removable and non-removable media. By way of example, and not limitation, the computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 50. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. The system memory 52 may include storage media in the form of volatile and/or non-volatile memory such as a ROM 56 and a RAM 62. A basic input/output system 60 (BIOS), containing algorithms for transferring information between components within the computer 50, may be stored in the ROM 56. Data or program modules that are immediately accessible or are presently in use by the processing unit 51 may be stored in the RAM 62. Data normally stored in the RAM 62 while the computer 50 is in operation may include an operating system 64, application programs 66, program modules 70, and program data 72.

The computer 50 may also include other storage media such as a hard disk drive 76 that may read from or write to non-removable, non-volatile magnetic media, a magnetic disk drive 92 that reads from or writes to a removable, non-volatile magnetic disk 94, and an optical disk drive 96 that reads from or writes to a removable, nonvolatile optical disk 100. Other usable types of storage media include magnetic tape cassettes, flash memory cards, digital versatile disks, digital video tape, solid state RAM, and solid state ROM. The hard disk drive 76 may be connected to the system bus 54 through a non-removable memory interface 74. A removable memory interface 90 may connect the magnetic disk drive 92 to the optical disk drive 96.

The disk drives 92, 96 transfer computer-readable instructions, data structures, program modules, and other data for the computer 50 to different storage media 94, 100 for storage. A hard disk drive 76 may store an operating system 80, application programs 82, other program modules 84, and program data 86. These components may be the same or different from the components stored in the system memory 52 (e.g., the operating system 64, the application programs 66, the other program modules 70, and the program data 72).

The user may interact with the computer 50 through input devices such as a keyboard 106 or a pointing device 104 (i.e., a mouse). A user input interface 102 may be coupled to the system bus 54 to allow the input devices to communicate with the processing unit 51. A video interface 120 may couple a display device (e.g., a monitor) 122 to the system bus 54.

The computer 50 may operate in a networked environment using logical connections to one or more remote computers 114. The remote computer 114 may be the PC 12, the server 34, the router 20, or other common network node as illustrated in FIG. 1. The remote computer 114 typically includes many or all of the elements previously described with respect to the computer 50, even though FIG. 2 illustrates only a memory storage device 116. Logical connections between the computer 50 and one or more remote computers 114 may include a wide area network (WAN) 112. A typical WAN is the Internet. When used in a WAN, the computer 50 may include a modem 110 or other means for establishing communications over the WAN. A user input interface 102 may connect a modem 110 to the system bus 54. In a networked environment, the remote memory storage device 116 may store program modules depicted relative to the computer 50. By way of example, and not limitation, FIG. 2 illustrates website data and remote application programs 124 as residing on the memory device 116. As may be appreciated, other means of establishing a communications link between the computer 50 and the remote computer 114 may be used.

As previously described, the system may award users with redeemable points for many reasons, such as, in exchange for collecting and releasing user demographic information to proprietors or clients and for users taking any action associated with a "campaign," or set of rules negotiated by the proprietor. As used herein, a user or member may be any person, apparatus, method, or the like that employs a computing device, such as the computer 50, to access the system to earn redeemable points by completing proprietor-defined tasks in exchange for submitting and releasing demographic information to the system.

Further, as used herein, "demographic information" may be construed broadly and may include any kind of member descriptive data, any activity associated with a member, or any transaction associated with a member. Demographic information may be gathered by the system upon user registration in the form of a questionnaire designed to solicit various demographic data of interest to the proprietors. The questionnaire may be in the form of a website page or any other format able to collect demographics information from the user. Users may register in a variety of ways including direct registration at the central web site hosted by the enterprise system, registration through web site proprietors, a web based "refer-a-friend" program, third-party direct mailing, or other partner relationships. A user may need only to register with the system once. However, the user may earn additional points by completing future, supplementary questionnaires. Typical examples of information gathered by the questionnaires include the user's age, income, occupation, etc. Further, the system may award points to a user for performing specific actions such as viewing web-based content, purchasing goods or services through a system-sponsored website, or a proprietor's website, a proprietor's brick-and-mortar facility, or for any other action associated with the system. The demographics information, to include, without limitation, information gathered by a questionnaire or records of any user action taken at the suggestion of or related to the system and a proprietor campaign, may be aggregated into a unique user profile. Once the user creates a profile, all future user activity within the system may be uniquely associated with the user's profile. A user may participate in the system by using a network (e.g., the network 10) and a PC (e.g., the PC 12).

Further, as used herein, a proprietor or client may include any entity, corporation, web site manager, business owner, or the like that coordinates with the system by submitting a set of proprietor-defined award rules or tasks that a user may complete to earn redeemable points. The proprietor may also purchase user demographic information from the system and provide product price reductions or other benefits to users in exchange for user demographic information, or may complete any combination of these functions. This set of proprietor-defined rules or tasks may be called a "campaign." Each campaign may further include a template for e-mails to be sent by the system to targeted users. A proprietor may compensate the system for receiving the users' demographic information in a number of ways including: monthly sponsorship fees for the system displaying the proprietor's offers on the central web site; per-action fees when users follow specific actions provided to the system; per-click fees for users clicking on hyperlinks provided in targeted e-mails advertising proprietor services or products and directing the user to a proprietor Web page; per-e-mail delivery fees; advertisement placement within "newsletter" e-mails that the system may send to all (or a portion of) system-registered users; and other fee combinations including indirect, agency relationships between proprietors and the system. Also, the system may compensate a proprietor for soliciting new memberships. The system may further automate billing clients based on a set of billing rules within each campaign. The billing rules may be associated with award rules and user activity. For example, within a particular campaign, an award campaign rule may award a member two hundred points for making a single purchase with a proprietor. The campaign may also include a billing rule, for example, indicating that the proprietor may be billed at five percent on all purchases made by the member, even though only the first transaction awarded points. Also, a proprietor may customize its campaign to award a user points in a variety of methods. For example, a proprietor may choose the number of points to award to users, may specify activities or questions that the user must complete before the system awards points, or may limit the frequency at which the system may award points to users for visiting the site. A proprietor may also dictate different user questionnaires during the registration process or may provide an additional questionnaire as a user task to be completed by the user to earn additional points.

Also, as used herein, the system may refer generally to the method or apparatus that coordinates user and proprietor functions by collecting user demographic information, awarding redeemable points to the users, tracking points for the users or proprietors, aggregating statistical information concerning user activity and the demographic information, maintaining the proper function of all user and proprietor activity, providing statistical and demographic information to the proprietors, sending targeted e-mail to the users, and executing any other management or coordination functions. The targeted e-mails may contain hyperlinks that direct users to proprietor offers that may award or redeem points to a specific user account. The system may include a collection of devices, typically one or more of the computers 50, the servers 34, and the data stores 116 connected to and in communication with the user PC 12 through the network 10.

Figure 3:
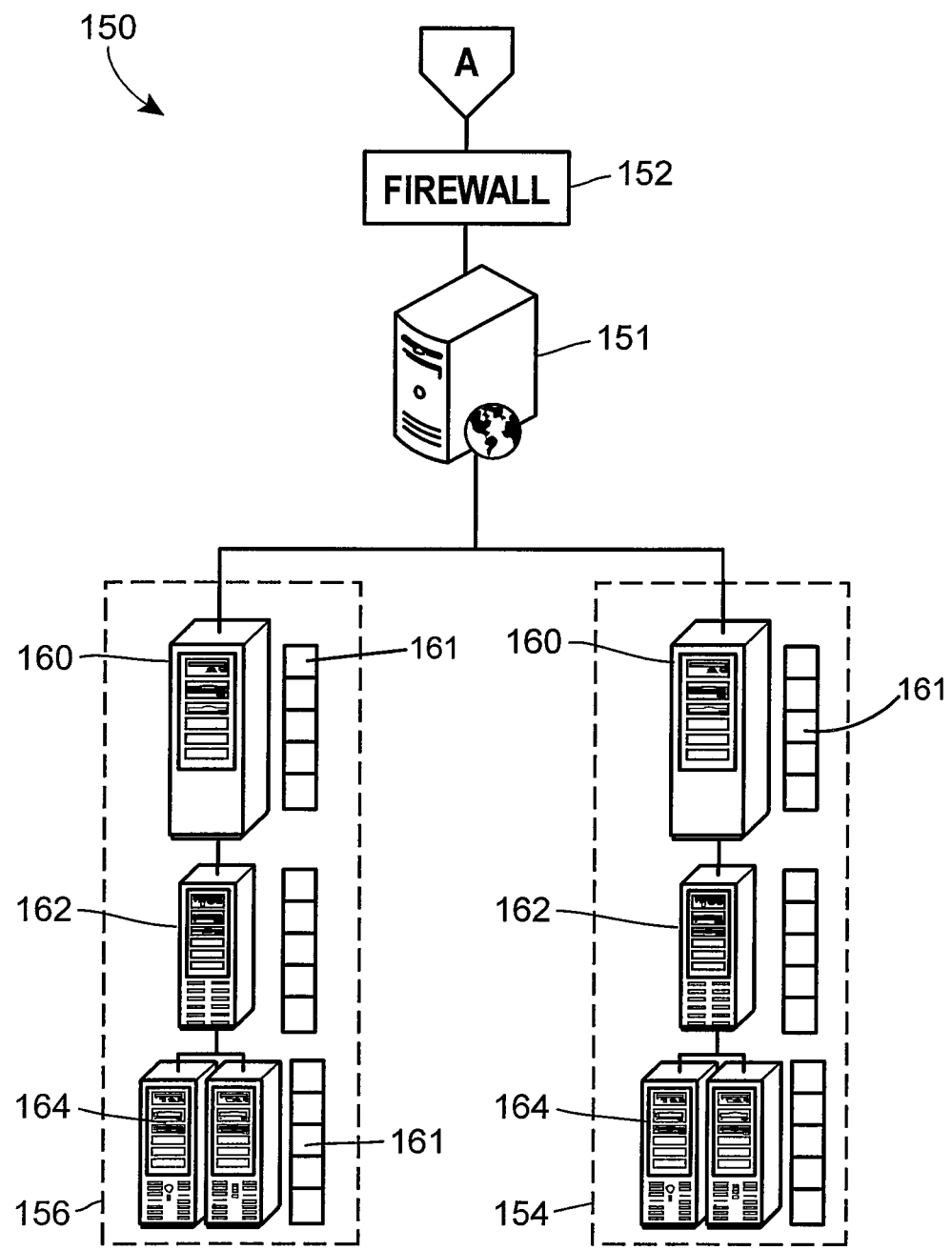
FIG. 3 depicts a diagram of one example of an enterprise system including two groups of servers, a web server, and a firewall as connected to the network of FIG. 1.
Figure 5:
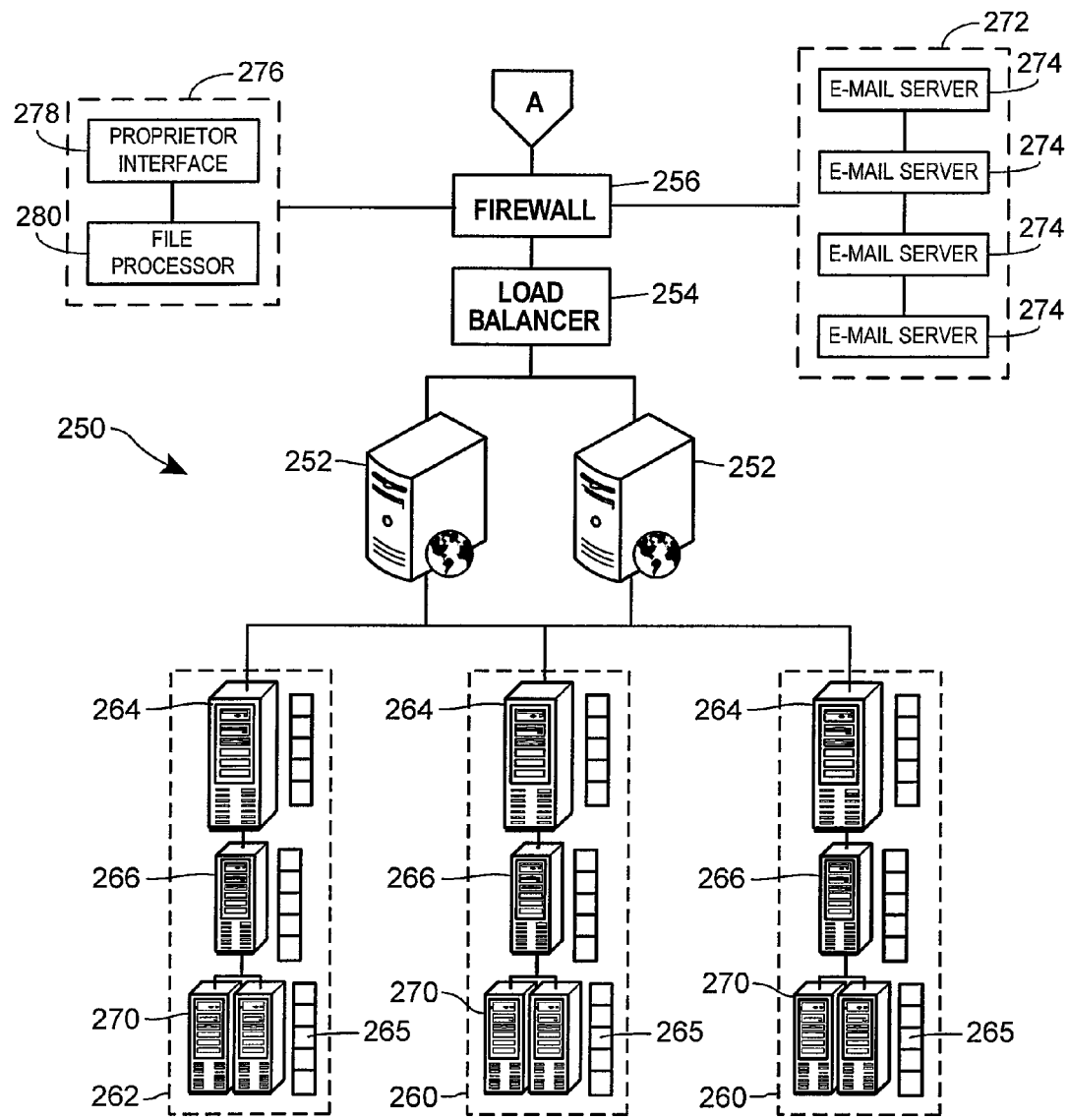
FIG. 5 depicts another diagram of one example of an enterprise system including a load balancer, a plurality of member server groups, a plurality of e-mail servers, a proprietor interface system, and a single administrative server group.

In one embodiment, a system 150 for collecting demographics information in exchange for awarding redeemable points may include a variety of structures and components as generally described in relation to FIGS. 3 and 5. Therefore, the system configurations described in relation to FIGS. 3 and 5 may include any combination of elements described in relation to each figure.

With reference to FIG. 3, the system 150 may include an architecture that is N-tier with a web server 151 in communication with a system firewall 152 through which a user may access a website hosted on the web server 151 by the system 150. The system firewall 152 may provide a secure, high-speed connection to a computer network such as the Internet as illustrated in FIG. 1. The web server 151 may face the users and communicate with a number of server groups or "silos" such as a silo 154 and a silo 156. A silo may be a conceptual collection of servers that work together through an application interface. Each of the silos 154, 156 may include, for example, an application server 160 that may execute a system application program 161.

With reference to FIG. 2 and FIG. 3, a system application program 161 running on the application server 160 may be one of the application programs 66 or one of the remote application programs 124 and may perform any coordination, transformation, or update process on the data entering or exiting a master data server 162. Further, the system application program 161 may execute on any general computing device, such as the computer 50, or on any system component. The system application program 161 running on the application server 160 may include, for example, any combination of an e-mail engine, a parameter engine, a validation engine, a crypto engine, an award engine, or a transaction engine.

Referring still to FIG. 3, the application server 160 may communicate between the web server 151 and the master data server 162 to pass data from the web server 151 or to pass data generated by the system application programs 161 to the master data server 162 or any other element of the system 150. The master data server 162 may include a portion of the total system data and, for example, may include user demographic data, campaign data, and any other data used by the system 150. In turn, the master data server 162 may communicate with one or more replication data servers 164. The replication data servers 164 may include a duplicate copy of the user profile data assigned to the silos 154, 156.

Adding additional silos 154, 156 may expand the system capacity. The silos 154, 156 may also provide specialized functions within the system 150. For example, the silo 156 may be an administrative silo 156. The system 150 may use the administrative silo 156 to manage system information, campaign information, or any other information not related to the user profiles. The administrative silo 156 may also include a lookup table that may direct any data queries to the correct member silo 154. The administrative silo 156 may combine several different functions together, or it may be split apart into separate silos. For example, one administrative silo may contain campaign information while a separate administrative silo may contain a lookup table to direct any data queries to the correct member silo 154. Alternatively, there could be a third administrative silo which manages, for example, inventory information for redemptions. Thus, the administrative functions need not be confined to a single administrative silo. It should be noted that separating some functions into multiple administrative silos may increase the scalability of the system as a whole.

The member silo may hold the system 150 member information. The member information may include, for example, the user profile, demographics data, transactions, or point balances. As illustrated in FIG. 3, a system comprising one member silo 154 may hold approximately 100% of the total user information for the system 150. Upon registration, the system 150 may store a member's information in the member silo 154. The silo containing the member's registration data may be called the member's "home silo." The system 150 may keep each member's information in the member's "home silo," where the information may remain unless more member silos are added to the system 150.

Figure 4:
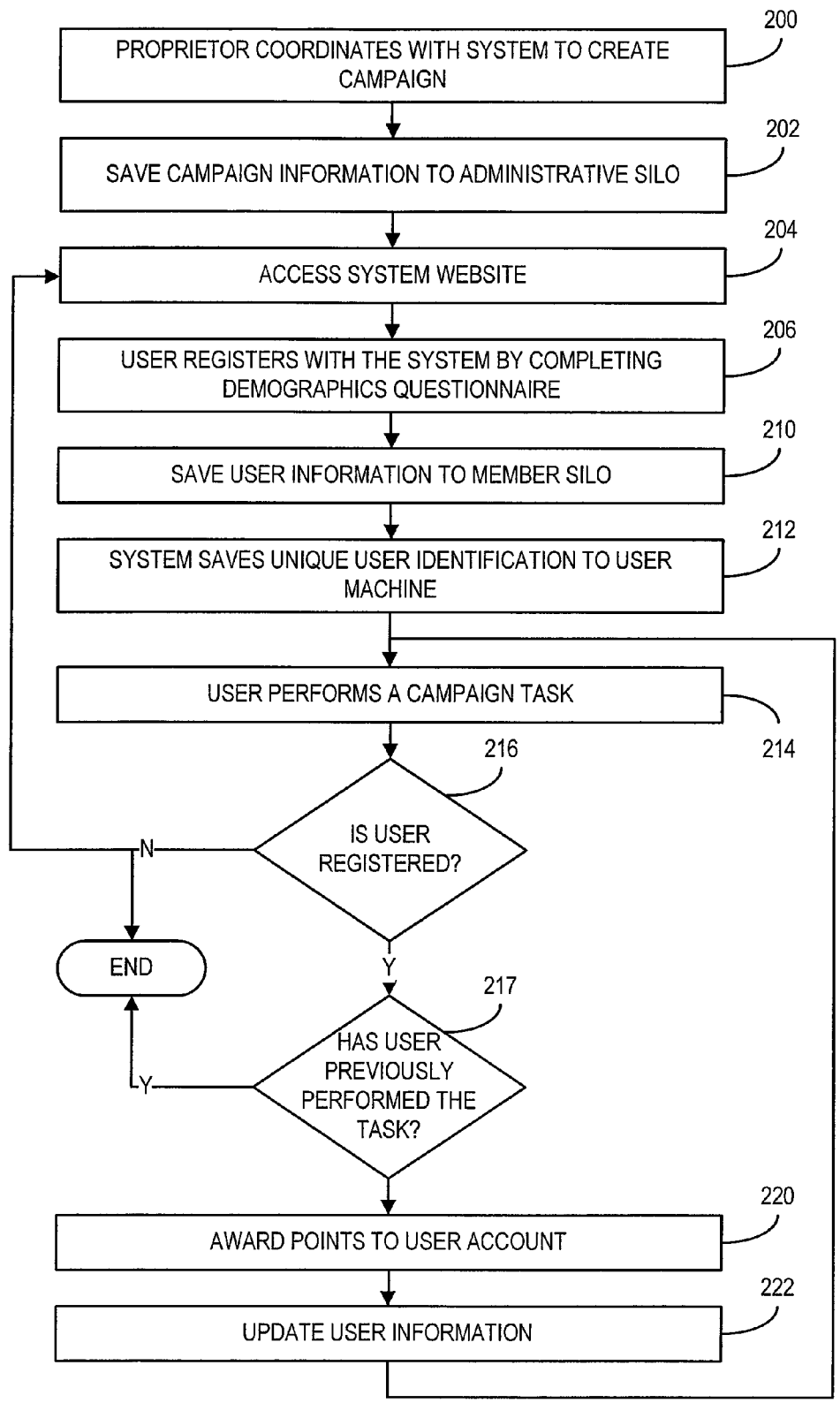
FIG. 4 depicts a flowchart illustrating a method of one example of using the system of FIG. 3 to award points in exchange for demographics information.

With reference to FIG. 1, FIG. 3, and FIG. 4, a method employing the system 150 may provide a user with a number of redeemable points for the user's submission of demographic information and participation in a variety of e-commerce related activities, including making purchases from proprietors, viewing advertisements in e-mail messages, clicking on links to visit proprietor web sites, etc. The user may then redeem their points for products and services from the participating proprietors such as retailers, theaters, restaurants, airlines, and hotels, among others. A proprietor may coordinate with the system 150 to create a campaign (block 200). For example, the proprietor may request information from the system 150 to target a specific demographic variable such as age, gender, income, or occupation. The system 150 may distribute the campaign information to the silos 154, 156 and across all of the system master data servers 162 (block 202). A user may login to the system 150 using a general purpose personal computer (PC) 12 connected to a network 10 such as the Internet (block 204).

As previously described, the user may register with the system 150 by accessing a web site hosted on the web server 151 by the system 150. During registration, the user may complete a demographics questionnaire in the form of a web site or other electronic document (block 206). The demographics questionnaire may include various questions concerning the user's background including, for example, the user's age, gender, postal code, job title, or marital status. The system 150 may collect the demographics data in a variety of formats including free-form text, drop down menu selections, or Boolean values.

The system 150 may save the user's registration information and demographic data to a member silo 154 (block 210). The system 150 may additionally or alternatively save a unique user identification to the user's PC 105 (block 212). The system 150 may use the unique user identification to associate proprietor campaign tasks and user actions to award points. In addition to storing the unique user identification on the administrative silo 156, the system 150 may encrypt the unique user identification in the form of a "cookie" associated with the user's browser that the system 150 may later use to associate the user with the registration information stored on the administrative silo 156. Further, the system 150 may assign a 64-bit random number to each user upon registration and associate that number with the member record on the system 150. Due to the extremely low statistical probability of assigning identical 64-bit random numbers to more than one member upon registration, the system 150 need not verify that the system 150 has not previously assigned the random number. The random assignment of user identification may allow the system 150 to more easily select random user demographic information for analysis. Particularly, because the system 150 assigns the numbers randomly, any set of records associated with a sequential selection of the random user identifier may be very unlikely to overlap with any other set chosen by the random number. Further, because the system 150 uses the random numbers only for choosing a random set of members for statistical analysis, a small number of users with identical random numbers will not distort the results. Therefore, because the probability of the system 150 assigning identical 64-bit random numbers is very small, and a few identical numbers will have very little effect on statistical analysis, it may be unnecessary to ensure that a random number has not been previously assigned.

The user may perform any of the tasks or actions specified in the proprietor's campaign stored on the administrative silo 156 to earn redeemable points (block 214). For example, a campaign task may be visiting the proprietor's web site, viewing one or more advertisements presented in an e-mail message, responding to an e-mail message generated by the system 150, or selecting a hyperlink included in an e-mail message generated by the system 150.

Each proprietor web site may include a visual cue that the web site is a member of the points-awarding program. The visual cue may include a hyperlink pointing to the web server 151. The hyperlink may include a code called a "cell identification" that may optionally be encrypted and may associate the user's selection of the hyperlink with either or both of the user identification or a campaign task saved on the administrative silo 156. Further, the cell identification may provide information associated with all campaign rules. A user may also receive and select hyperlinks associated with a proprietor's campaign in an e-mail message generated by an e-mail engine running as the system application program 161 on the replication server 164.

Alternatively, the e-mail engine could execute on the application server 160. However, to increase efficiency, the e-mail engine may execute on one or more of the replication servers 164 on each member silo 154. In this way, the e-mail engine may communicate locally with the database, avoiding network traffic and also avoiding an additional load on the application server 160 which may also service member requests in real-time. Local communication between the e-mail engine and the database may be possible because the e-mail engine may work with a replicated copy of the member information. Further, local communication may provide for scalability, as such local communication would allow inclusion of additional replication servers 164. For example, the replication servers 164 could be increased from two to four so that more than one e-mail engine is running for a given member silo 154.

The administrative silo 156 and the application server 160 may validate the user's registration with the award program by comparing the user's cookie file with the registration information stored on the administrative silo 156 (block 214). A validation engine running as the system application program 161 on the application server 160 may perform the validation process. If the information received by the application server 315 is encrypted, a crypto engine running as the system application program 161 on the application server 160 may decrypt the information. If the user is not registered (determined at block 216), the process may terminate or, alternatively, the user may be directed to the system registration web site (block 204). If the user is validly registered, the system 150 may proceed.

The validation engine may determine (at a block 217) if the user has previously completed the campaign task (at block 214). As described above, awarding of points may be conditional and defined by the proprietor campaign rules. The proprietor may define the campaign tasks and rules, which the system 150 may store on the administrative silo 156 or distributed across all silos 154, 156. The cell identification may allow the system 150 to index the tasks and rules on the administrative silo 156. Using the cell identification, the validation engine may determine that a particular cell identification has previously been used, also indicating that the user has previously performed the task and that the user is ineligible for additional points. If the user has previously performed the task, the system 150 may terminate or direct the user to perform a different task. If the user has not yet performed the task, the system 150 may proceed.

If the user is validly registered and has not yet performed the present campaign task (determined at block 217), a transaction engine running as the system application program 161 on the application server 160 may award a predetermined number of points to the user's account (block 220) saved on the member's home silo 154 by associating the campaign task, cell identification, and point quantity with the unique user identification.

The transaction engine running as the system application program 161 on the application server 160 may update transaction information associated with the user at the member's home silo 154 (block 222). The system 150 may later use the transaction information to develop demographic information and statistics associated with the user actions to provide to the proprietors. Therefore, when the user visits the proprietor site, the system 150 may automatically award points to the registered user without requiring the user to leave the proprietor web site. The system 150 may be distributed across multiple participating web sites and may operate without the knowledge of the user. Optionally, the proprietor's web sites may determine whether a web site visitor is one of the participating users.

The system 150 may also provide hyperlinks to redemption sites at which users may convert earned points into products or services. The hyperlinks may be embedded in e-mails generated by the e-mail engine system application program 161. Further, the hyperlinks may point to redemption web sites hosted by the system 150 or on hosts at any other proprietor-designated site. The system 150 may automatically accept redemption orders, may place purchase orders with vendors for the requested product or service, and may direct the proprietor or vendor to deliver the redeemed products to the user. The system 150 may automatically deduct the points from the user's account.

The system 150 may also develop demographic information and statistics to provide for the proprietors. The system 150 may associate the user demographic information with the user's actions associated with the proprietor or any other web site. For example, the system 150 may calculate the percentage of the males visiting a particular web site or web pages by looking at each participating visitor in the member silo 154, checking a field in the member silo 154 for each member's gender, and tabulating the results.

With reference to FIG. 5, in some embodiments a system 250 may include a distributed architecture that is N-tier with web servers 252 that may communicate with a load balancer element 254. The load balancer element 254 communicates with a system firewall 256 and the web servers 252. The load balancer 254 may randomly distribute all data entering the system 250 through the firewall 256 across the web servers 252. The web servers 252 may then determine a silo 260, 262 to which the web servers 252 will send the data. Thus, upon the receipt of data, the load balancer 254 may randomly select one of the random web servers 252, and the randomly-selected web server 252 may forward the data to a specific one of the silos 260, 262 or to a randomly-selected one of the silos 260, 262. The randomly-selected one of the silos 260, 262 may then determine whether to process the data or forward the data to another one of the silos 260, 262. The load balancer element's 254 random distribution of data may reduce data latency through the system 250. The load balancer element 254 may include a method executing on a computer (e.g., the computer 50) or on any device associated with the system 250 as either software or hardware.

The system firewall 256 may provide a secure, high-speed connection to a computer network such as the Internet (i.e., the network 10) as illustrated in FIG. 1. The web server 252 may face the users and communicate with a number of silos 260, 262. A silo may be a conceptual collection of servers that work together through an application interface. Each silo 260, 262 may include, for example, an application server 264 that may execute a system application program 265. A system application program 265 running on the application server 264 may perform any coordination, transformation, or update process on the data entering or exiting the master data server 266. Further, a system application program 265 may execute on any general computing device 50 in communication with the master data server 266. A system application program 161 running on the application server 160 may include, for example, any combination of an e-mail engine, a parameter engine, a validation engine, a crypto engine, an award engine, or a transaction engine. Each silo may include an application server 264, wherein the application server 264 may communicate between the web server 252 and a master data server 266, and the master data server 266 may communicate with replication data servers 270. The replication data servers 270 may include a duplicate copy of the user profile data assigned to a silo 260, 262.

The silos 260, 262 may provide simple system expandability by providing more silos 260, 262 to the system. The silos 260, 262 may also provide specialized functions within the system 250. For example, the silos 260, 262 may include an administrative silo 262 and member silos 260. The system 250 may use the administrative silo 262 to manage system information, campaign information, or any other information that may not relate to the user profiles. The administrative silo 262 may also include a lookup table that may direct any data queries to the correct member silo 260. The member silos 260 may hold an equal or approximately equal fraction of the total amount of user information contained in the system 250 as determined by the load balancer 254. As illustrated in FIG. 5, a system comprising two member silos may each hold approximately 50% of the total system user information. Upon registration, a user's information may be stored on a single, randomly-selected (or algorithmically-selected) member silo 260. The silo containing the user's registration data may be called the user's "home silo." Each user's information may be kept in the user's "home silo," and may remain in the home silo unless the member silos 260 are rebalanced. By randomly assigning profiles to the silos, the system load may be balanced and the number of user profiles saved to a single member silo 260 may be no more than any other individual silo 260.

With reference to FIG. 5, and as previously described in relation to FIG. 4, the system 250 may need periodically to retrieve from or update data to the user's home silo and/or the member silo 260. To correctly identify the user's home silo upon a retrieve or update action, the user's home silo identifier may be persistently stored in several different forms. Particularly, the home silo identifier may be part of a hyperlink in a bulk e-mail message sent from the system 250 to the user. Further, the home silo identifier may be part of a URI stored at the user's computer, or may be part of a cookie file. The persistent storage of the user's home silo identifier on the user's computer may also reduce any system overhead associated with finding the user's information. However, once the user accesses the system 250, viewing of successive pages during a single session does not require the home silo identifier; the system 250 only requires the home silo identifier upon the first action a user takes at the system 250 during the session. Therefore, the system 250 may acquire user's unique identification number and home silo identifier through encrypted information embedded in a hyperlink included in an e-mail message or from any other source. By using the encrypted information, the user may not need to login to the system 250 to complete a transaction. A user may only need to explicitly login to the system 250 when the user visits the central website without going through a hyperlink containing the encrypted identification information and the user's browser does not contain an identifying cookie, or, when the user may perform a "sensitive" action associated with a user's private information or a transaction that may decrease the user's accumulated points.

The system 250 may identify not only the user's home silo but also cached user information through the use of an "application server session." During an application server session, the system 250 may automatically store a cookie on the user's browser. The system 250 may then use the cookie to locate any cached information (including the user's home silo identifier) on successive page views. During an application server session, the cookie may be referred to as a "session cookie." Thus, while the user is actively accessing the system 250 and keeping open a session with the system 250 (i.e. the user does not end the session by closing the browser, deleting all browser cookies, or otherwise ending the session), the system 250 may not need to actively find the user's home silo identification. The system 250 may automatically forward requests to a user's home silo based on the user's application server session. The system 250 may automatically forward the requests using an Apache™ web server 252 with ModJK extensions to a Jetty™ Java™ servlet engine application server 264.

The system 250 may also assign each member record one or more persistent identifiers. A persistent identifier may be a record parameter that does not change during the lifetime of the database record. For example, while a user may change certain record parameters, such as the user's address or a particular interest, a persistent identifier may reliably be associated with the record without modification during the lifetime of the record. As described above in relation to FIG. 4, one example of a persistent identifier may be a very large, randomly-generated number assigned at the time of record creation. A 32 or 64-bit random number may offer a sufficiently large range of possible numbers to assign, with a high degree of certainty, a unique random number to each record. Another example of a generating a substantially unique persistent identifier may be applying a hash algorithm, for example, Message-Digest algorithm 5 (MD5), to a demographic value that is unique to a member (e.g., a social security number). The system 250 may choose a random number within the large range of random numbers and assign it to the record. Because the range of possible persistent identifiers is sufficiently large, the system 250 may avoid checking for records previously assigned the same persistent identifier. The random number may be larger or smaller than 64-bits. The random persistent identifier may also be alphabetic, alphanumeric, or any symbol or combination of symbols that may be fully ordered. Because the system 250 may assign each member a random number between 0 and $2^{64}$, records may be randomly distributed along a range of the random numbers.

Additionally, the system 250 may include a proprietor interface system 276, which may communicate directly with the system 250 through the system firewall 256. The proprietor interface system 276 may allow a proprietor to access directly user data stored on the system silos 260, 262. This access may allow the proprietors to collect demographic and statistical information concerning the user data on the silos 260, 262. The proprietor interface system 276 may include a proprietor interface 278. The proprietor interface 278 may be a secure connection to allow the proprietors to upload data to or download data from the proprietor interface system 276. The proprietor interface 278 may employ a protocol enabling the secure transmission of web pages such as hypertext transfer protocol over a secure socket layer (https).

The proprietor interface 276 may be in communication with a file processor element 280. The file processor element 280 may allow proprietors to access the system 250 to shop for demographics information or to store and process client information or added demographics questions for use during user registration. Proprietors may also upload member activity stored as member transactions in the member's home silo and which may trigger both billable activity transactions and award transactions in association with each particular member and each particular campaign.

Further, the system 250 may communicate through the firewall 256 with an e-mail relay system 272. The e-mail relay system 272 may include one or more servers 274 in communication with the system 250. The e-mail relay system 272 may transmit outgoing e-mail messages, such as e-mail messages associated with a particular campaign, and may receive and route incoming e-mail messages (e.g., bounced e-mail messages) to the proper components of the system 250. Bulk e-mail messaging is an effective means of sending advertisements to consumers and other users when a proprietor or marketer desires to reach a minimum number of potential customers during the campaign or test.

However, the use of e-mail messages as an advertising medium is not without its limitations. Most e-mail viewing clients, such as web browsers (e.g., Internet Explorer, Firefox, Safari, etc.) and e-mail clients (e.g., Microsoft Outlook, etc.), prohibit JavaScript or plug-ins from executing within the context of viewing an e-mail message. Thus, many of the techniques used to enrich and personalize the user experience in a web page are not widely available in the context of an e-mail message. An e-mail message may be formatted in the form of an HTML e-mail, which may include images (including animated images) arranged in a two-dimensional layout along with text of various fonts and colors. The e-mail message may also include one or more links (specifying Uniform Resource Identifiers, also referred to as "URIs") which, upon clicking, take the user (also referred to herein as the recipient) to some destination on the World Wide Web. A person viewing the e-mail message may activate the links by clicking on text and/or by clicking on an image within the e-mail message.

Aside from the restriction of JavaScript and plug-ins, there is the additional limitation that the HTML content of an e-mail message is static (i.e., it does not change after transmission from the e-mail server). This may limit the effectiveness of an advertising campaign employing e-mail messages, for example, where the e-mail message is time-limited (e.g., where a particular advertisement or offer expires). In particular, it is commonly known that when displaying one offer or promotion near the top of the e-mail message (which is the first part typically viewed by a user), and displaying another offer or promotion near the bottom of the e-mail message, a viewer of the e-mail message is far more likely to respond to the offer near the top. Thus, the ability to present different offers (e.g., in rotation or dynamically selected based on criteria that may vary after composition, transmission, and delivery of the e-mail message) near the top of the e-mail message may improve the effectiveness of the e-mail message. While JavaScript or plug-ins would make this type of enhancement relatively easy in the context of a web page, as described above, JavaScript and plug-ins are not usually viable alternatives in the context of an e-mail message.

Yet another known limitation of e-mail messaging is that, while the validity of an offer may be limited to a time of day or a day of week, it is often technically difficult and/or expensive for a proprietor to arrange for a system to send a high volume (e.g., millions) of e-mail messages such that the messages all arrive within a narrow window of time (e.g., within one hour). Moreover, the delivery time of an individual e-mail message depends not just on when a server transmits it, but also on other factors such as internet traffic, delays at the various internet service providers (ISPs) associated with the various recipients, etc. Of course, it is also possible that a recipient of an e-mail message may not open an e-mail message immediately upon receipt of the message.

Known methods exist for displaying multiple offers or promotions near the top of an e-mail message. For example, one widely supported capability upon which such methods may rely is the ability to display an image having multiple "frames" using a frame-sequence animation format, such as the animated GIF format. As is generally known, an animated GIF file is an image file of a particular format that contains one or more image "frames," each frame being a full or partial image, such that the program displaying the file displays the frames in a sequence with some specified wait time or delay between each frame, and optionally displays the frames in a loop (i.e., after displaying all of the frames in the sequence, the sequence starts again). Most of the widely used e-mail viewing clients such as Internet Explorer, Firefox, Microsoft Outlook, etc. support display of animated GIF files ("animated GIFs"). Furthermore, e-mail service providers (e.g., Yahoo, Hotmail, Gmail, etc.) typically do not block or otherwise interfere with animated GIFs.

However, while animated GIF files may display multiple image frames, animated GIFs are nevertheless a single image file (specified in HTML by a single URI), and HTML does not provide a means to associate a different link (i.e., a different URI) with each frame of the animated GIF. That is, the link associated with an animated GIF remains static, even as the client displays the successive frames of the animated GIF. Thus, when a user clicks on a particular frame of an animated GIF in response to the advertisement or offer displayed in the frame, the link activated by the user always specifies the same location (i.e., the same URI). The consequence of this limitation is that there is no obvious means of sending the recipient to a URI that varies depending on the frame the recipient was viewing when the recipient clicked on the image in response to the displayed frame.

Figure 6A:
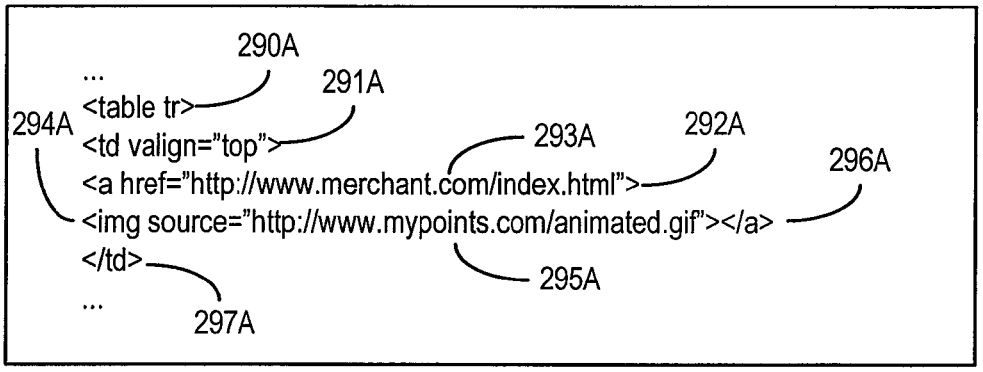
FIG. 6A depicts an exemplary segment of HTML code for placing a linked image into a table in an HTML e-mail message.

FIG. 6A depicts a segment of HTML code for placing a linked image into a table in a web page or an HTML e-mail message. A tag 290A specifies the beginning of a table and the beginning of the first row. Next, a tag 291A specifies the beginning of a cell in the row, and that the contents of the cell will be aligned with the top of the cell. A tag 292A specifies the beginning of linked content and specifies a URI 293A for the linked content. A tag 294A specifies an image and indicates that the source of the image is a URI 295A. A tag 296A indicates the end of the linked content, and a tag 297A indicates the end of the cell in the table. A web or e-mail client interpreting the HTML code depicted in FIG. 6A would display the image "animated.gif" retrieved from the URI 295A (i.e., "http://www.mypoints.com/animated.gif"). If a user clicked on the image, which comprises the linked content, the client would direct the user's web browser to the page specified by the URI 293A (i.e., "http://www.merchant.com/index.html").

The presently-described methods and systems circumvent this limitation by relying on knowledge of the timing of the presentation of the frames displayed by the e-mail client. When the recipient of an e-mail message implementing the following method opens the e-mail message, the e-mail client downloads a multi-frame image (e.g., an animated GIF) from the server by requesting the image at a URI specified in the HTML code as the image source ("the image URI"). The image URI may include a name or other identifier (described further below) that is unique to the particular e-mail message (e.g., unique to the recipient, the campaign, or both). When the e-mail client requests the image specified by the image URI ("the image request"), the request may reveal the unique identifier to the advertising system 250. As used hereinafter, references to the system 250 may refer to any of the servers 252, 264, 266, 270 that may process data and/or execute portions of the methods described herein. The HTML code in the e-mail message also associates the multi-frame image with a URI ("the link URI"). Thus, when the recipient clicks on the multi-frame image in response to a displayed frame, the e-mail client directs the recipient's web browser to the web page specified by the link URI. The link URI may contain the same identifier as that in the image URI. In this manner, the advertising system 250, having knowledge of the sequence and timing of the frames in the multi-frame image file served to and displayed by the e-mail client, may determine which frame the recipient is viewing when the recipient clicks the image and activates the associated link. The request caused when the recipient clicks on the animated GIF is referred to herein as a "click request."

Figure 6B:
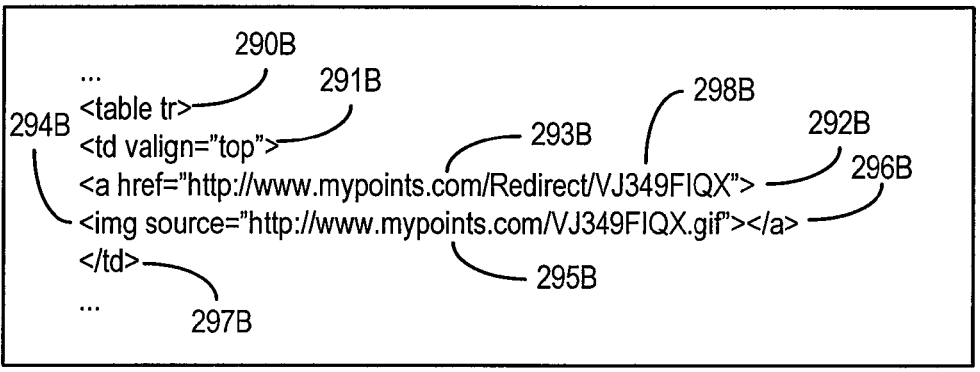
FIG. 6B depicts an exemplary segment of HTML code for placing a linked image into a table in an HTML e-mail message in accordance with the presently described embodiments.

FIG. 6B depicts an exemplary segment of HTML code that the system 250 could use in implementing the methods described herein. A tag 290B specifies the beginning of a table and the beginning of the first row. Next, a tag 291B specifies the beginning of a cell in the row, and that the contents of the cell will be aligned with the top of the cell. A tag 292B specifies the beginning of linked content and specifies a URI 293B for the linked content, which URI 293B includes an identifier 298B. A tag 294B specifies an image and indicates that the source of the image is a URI 295A, which URI 295B also includes the identifier 298B. A tag 296B indicates the end of the linked content, and a tag 297B indicates the end of the cell in the table. A web or e-mail client interpreting the HTML code depicted in FIG. 6B would display the image transmitted by the server in response to the request for the URI 295B (i.e., the image transmitted as "http://www.mypoints.com/VJ349FIQX.gif"). If a user clicked on the image, which comprises the linked content, the client would direct the user's web browser to the page specified by the URI 293B (i.e., "http://www.mypoints.com/Redirect/VJ349FIQX").

Figure 7:
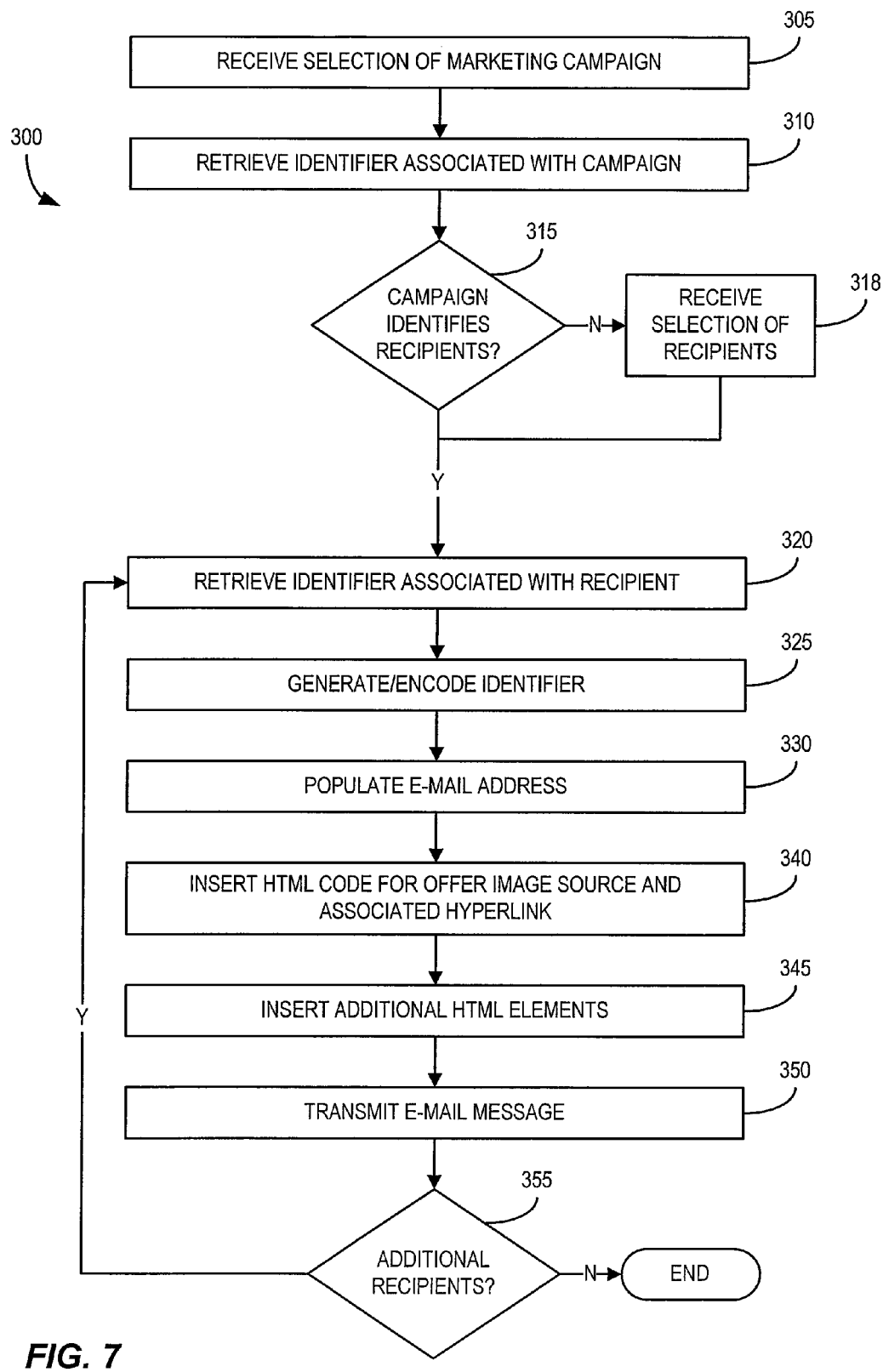
FIG. 7 depicts a flowchart illustrating an exemplary method of generating an e-mail message that may display dynamic content in accordance with one or more of the presently described embodiments.

FIG. 7 depicts a method 300 of composing an e-mail message that may include dynamic features in accordance with the presently-described methods and systems. The system 250 receives, from a proprietor or other user creating a bulk e-mail message using the system 250, a selection of a marketing campaign for which to create the bulk e-mail message (block 305). The proprietor may select the campaign using, for example, the proprietor interface 278 illustrated in FIG. 5. The system 250 may store information about the various campaigns available (i.e., previously created campaigns) on a server such as the master data server 266. The system 250 may next retrieve (e.g., from the master data server 266) an identifier associated with the selected campaign (block 310) and may determine (block 315) whether the campaign identifies intended recipients for the advertisements and/or offers associated with the campaign. If the selected campaign identifies the intended recipients of the advertisements and/or offers associated with the campaign, the system 250 may proceed to retrieve an identifier associated with the first intended recipient (block 320). On the other hand, if the selected campaign does not identify the intended recipients, the system 250 may receive from the proprietor a selection of recipients (block 318) by, for example, allowing the proprietor to select a random range of the persistent identifiers described above, or to specify one or more demographic traits associated with the available records (e.g., selecting records for participants between the ages of 18 and 25, selecting records for male participants in a particular geographic area, etc.). Having received a selection of intended recipients, the system 250 may proceed to retrieve an identifier associated with the first intended recipient (block 320).

Having retrieved the recipient identifier (at the block 320) and the campaign identifier (at the block 310), the system 250 may encode or create an identifier (block 325), such as the identifier 298B. As described above, the identifier 298B is preferably a unique identifier associated with one or both of the recipient of the e-mail message and the selected campaign, which identifier can be incorporated into a URI accessed by a client (e.g., a web browser client or an e-mail client) associated with the recipient when the recipient opens the e-mail message. In some embodiments, the system 250 may implement an encryption scheme to create the identifier 298B from the respective identifiers of the recipient and the campaign such that the system 250 may later decrypt the identifier 298B to reveal the recipient identifier and the campaign identifier. In other embodiments, the system 250 may concatenate the recipient and campaign identifiers to create the identifier 298B. In still other embodiments, the system 250 may assign a random number (e.g., a random 64-bit number) as the identifier 298B, and may additionally store a record associating the random number with the particular e-mail message (i.e., associating the random number with the campaign and the recipient). Of course, the identifier 298B may also be the cell identifier described above, or may be a variant of the cell identifier described above. In still other embodiments, the identifier may be stored as a cookie associated with a web browser used by the recipient, and not as part of one or more URIs stored as HTML in the content of the e-mail message itself. This may be particularly advantageous where a third-party (and not the advertising system) composes the e-mail message, but requires that the recipient's e-mail client and/or web browser allow the use of such cookies.

It is worth noting that in some embodiments, the system 250 may be operable to determine, without having an identifier embedded in the HTML content of the e-mail or using a cookie associated with a web browser, what frame the recipient of the e-mail message is viewing when the recipient generates a click request by clicking on the offer image. For example, the system 250 may instead rely upon the fact that both the image request and the click request originate from the same IP address. It is also worth noting that in some embodiments the link URI and the image URI may not identify the recipient of the e-mail message and/or may not identify the particular e-mail. For example, it is unnecessary to identify the particular recipient if the system 250 is not providing individual incentives (e.g., awarding points, etc.) to the recipients, or if the mechanism for providing the incentives does not depend on identifying the recipient, such as might be the case when a recipient clicks on an offer and the recipient's web browser navigates to an advertiser's web site so that advertiser can request the recipient to sign up for a newsletter, make a purchase, etc. In the process of doing so, the advertiser may collect identifying information about the recipient which may then be transmitted back to the system 250 allowing the system 250 to provide the incentive (e.g., award points, etc.)

In any event, after creating the identifier 298B (at the block 325) the system 250 may compose the e-mail message by inserting into an appropriate field (e.g., the "To" field) of the e-mail message an e-mail address for the intended recipient (block 330), and inserting into the body of the e-mail message HTML code including a URI (such as the image URI 295B) from which to retrieve an image associated with an offer or advertisement, which URI 295B includes the identifier 298B, and a link URI (such as the link URI 293B) associated with the selection of the image, which URI 293B also includes the identifier 298B (block 340). Next, the system 250 may insert into the body of the e-mail message additional HTML elements such as other image elements and/or text of an e-mail message (block 345), which text may include information for the recipient about when and how often to view the e-mail message. The system 250 may then transmit the e-mail message via the e-mail servers 274 (block 350). If the system 250 determines (block 355) that there are additional recipients, the system 250 may cycle back to retrieve the next recipient identifier (at block 320). Of course, those of ordinary skill in the art will recognize that many methods of generating and transmitting the e-mail message exist. As one example, the system 250 may not create an e-mail message prior to transmitting the e-mail message, but may instead create the e-mail message (including generating information inserted into the e-mail message at blocks 325-345) as the e-mail message is transmitted by e-mail servers 274 (e.g., the system 250 may execute the actions of blocks 320-345 concurrently with implementation of a mail protocol such as the simple mail transfer protocol (SMTP)). In another example, the servers (e.g., 252, 264, 266, 270, 274) within the system 250 shown in FIG. 5 may not generate or transmit the e-mail message at all but, instead, one or more servers (not shown) affiliated with a third party may generate and transmit the e-mail message and a server of the system 250 may provide the multi-frame image when the recipient opens the e-mail message. As used herein, the system 250 may include not only the servers depicted in FIG. 5, but may also include one or more third-party servers implementing at least a portion of the method or methods described.

Figure 8:
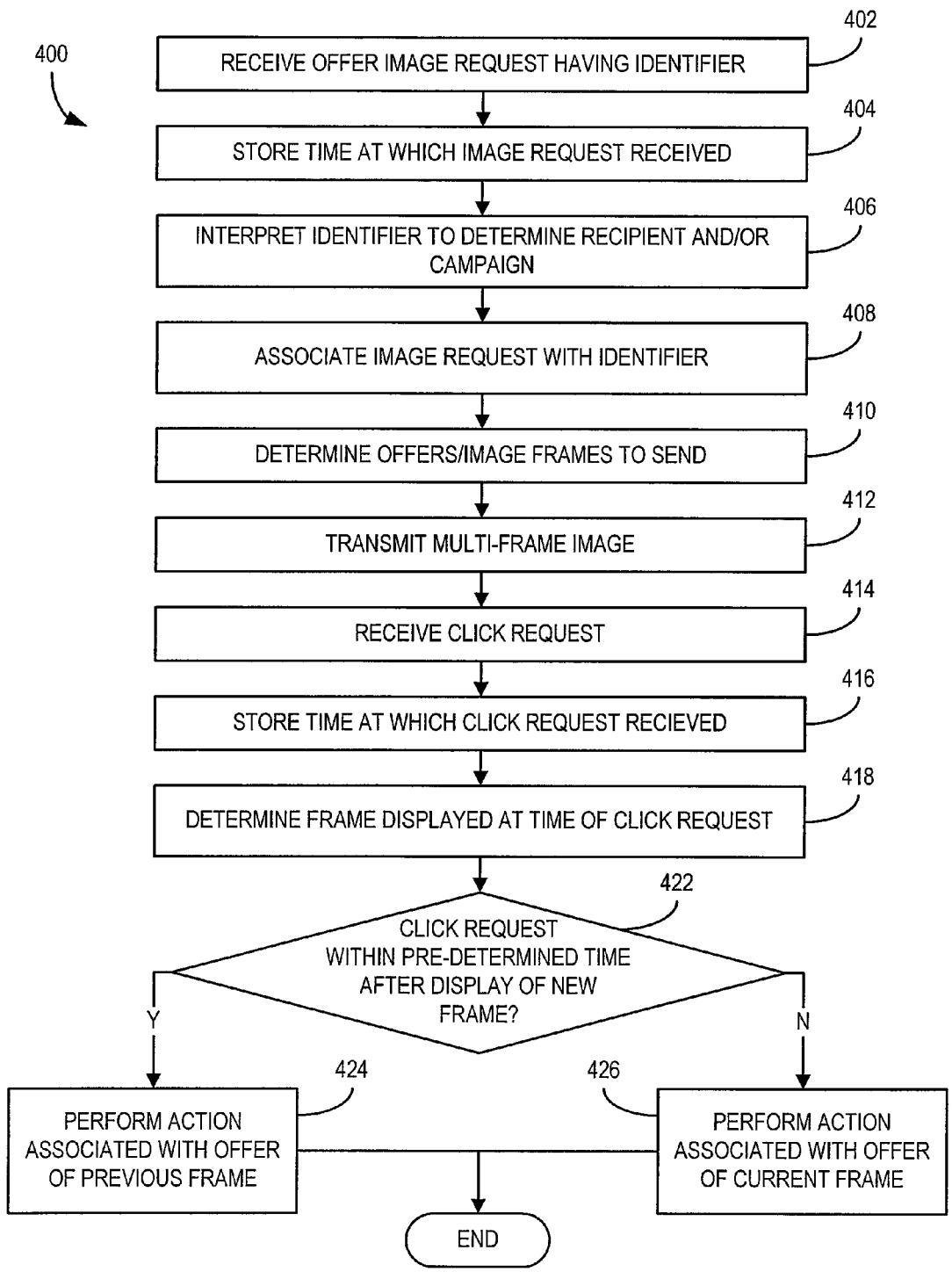
FIG. 8 depicts a flowchart illustrating an exemplary method of using a multi-frame image in an e-mail message to display dynamic content.

FIG. 8 depicts a method 400 of implementing dynamic e-mail in cooperation with an e-mail message generated and transmitted in accordance with the method 300 depicted by FIG. 7. When the recipient of an e-mail message composed and transmitted in accordance with the method 300 depicted in FIG. 7 opens the received e-mail message in an HTML-compliant e-mail client (e.g., Hotmail, Gmail, Yahoo, Microsoft Outlook, etc.), the e-mail client requests the image associated with the offer or advertisement specified by the image URI 295B (inserted at the block 340) (also referred to as the "offer image"). The system 250 receives the request for the offer image (block 402) and stores the time at which the system 250 received the request for the offer image (block 404). Next, the system 250 decrypts or otherwise interprets the received identifier 298B (block 406) to determine the recipient and/or campaign with which the identifier 298B is associated. The system 250 also associates the image request with the identifier 298B (block 408). Of course, the actions depicted in the methods 300 and 400 need not be executed in the exact order depicted in the figures. For example, in some embodiments, the system 250 may perform the action depicted at block 408 before performing the action depicted at block 406, or the system 250 may perform the actions concurrently.

Using the user and/or campaign information determined from the identifier 298B (at the block 406), the system 250 determines which offers and/or advertisements (and, therefore, which frames) to transmit to the e-mail client (block 410) in response to the offer image request received (at the block 402). The system 250 may determine which offers and/or advertisements (i.e., which frames) to transmit to the user according to one or more parameters including, but not limited to: the time, day, or date at which the system 250 receives the offer image request; the time, day, or date at which the system 250 is transmitting the offer image; the campaign with which the e-mail message associated with the request corresponds; the current location of the recipient (e.g., as determined from the IP address of the requesting client); previous responses by the recipient to the same e-mail message or campaign; what offers are currently available; demographic information associated with the recipient of the e-mail message; etc.

This flexibility allows the system 250 to determine after transmitting the e-mail message (or even after the recipient opens the e-mail message) the particular advertisements and/or offers (i.e., the particular frames) to transmit and display to the recipient, and to personalize the frames according to the various parameters enumerated above. For example, if the recipient views the e-mail message between 11:00 AM and 1:00 PM in the recipient's current time zone (e.g., as determined by the IP address of the client) or in the recipient's home time zone (e.g., as determined by an address associated with the recipient's demographic information), the system 250 could transmit a frame corresponding to a coupon offer for a hamburger lunch at a fast food restaurant located nearby or, if the recipient views the e-mail message between 3:00 PM and 8:00 PM, the system 250 could transmit a frame corresponding to a coupon offer for a steak dinner at a nearby restaurant. Alternatively, the system 250 may transmit during a specified period a frame indicating an offer to participate in a survey available only during that period. As another example, the system 250 may transmit a frame corresponding to a football-related offer if the recipient is male, but may transmit a frame corresponding to a volleyball-related offer if the recipient is female. As still another example, the system 250 may transmit one frame related to an offer if the recipient is male, but may transmit a different frame related to the same offer if the recipient is female.

The ability to determine after transmitting the e-mail message, or even in real time, what frames to display to the recipient of the e-mail message affords other advantages as well. For example, the recipient may view the e-mail message periodically (e.g., daily, weekly, etc.) to see other offers and/or advertisements, without requiring the system 250 to transmit another e-mail message each time new advertisements and/or offers become available. Along the same lines, the system 250 may transmit when the recipient views the e-mail message frames associated with advertisements and/or offers that were not available at the time the system 250 generated and transmitted the message to the recipient. Further, the dynamic nature of the frames displayed to the recipient may allow the system 250 to convey real-time or near-real-time information to the recipient. For instance, a frame displayed to the recipient may include a current bidding price of an auction item or the number of units remaining of a limited-edition item or a limited-availability item. Moreover, the dynamic nature of the frames may allow the system 250 to randomly insert into e-mail messages special advertisements and/or offers, such as "instant win" offers or "bonus point" offers.

In any event, having determined the plurality of frames to transmit to the e-mail client for display to the recipient (at the block 410), the system 250 may transmit to the e-mail client a multi-frame image file (block 412), such as an animated GIF file, wherein each frame corresponds to an offer and/or advertisement. The formats of such multi-frame image files and, in particular, the format of animated GIF files, are known among those of ordinary skill in the art and will not be detailed herein. However, to the extent that the presently-described systems and methods may take advantage of particular features of such multi-frame image files, those features will be described briefly herein with respect to animated GIF files. In particular, animated GIF files allow for each frame to have a pre-determined duration (i.e., a pre-determined delay before the display of the next frame) and allow the frames to be looped such that, after the viewing application (i.e., the e-mail client) displays the last frame in a sequence of frames, the sequence restarts with the first frame. It is also possible with the animated GIF format to keep the animated GIF file "open" by not sending a file termination byte. Of course, those of ordinary skill in the art will recognize that this maintains an open connection (i.e., an open TCP connection) between the recipient's e-mail client and the system 250 for as long as the system 250 is sending the frames of the animated GIF. Keeping the file open allows the system 250 to, for example, send frames one after the next at various intervals for as long as the recipient is viewing the e-mail message on the corresponding e-mail client. The system 250 may implement either the former "closed connection" method or the latter "open connection" method to transmit the frames to the e-mail client for display to the recipient. Of course, if the system 250 implements the "closed connection" method, the system 250 must determine which frames (i.e., the advertisements and/or offers) to transmit to the e-mail client prior to transmitting them, and the system 250 may only update and/or change the frames if the recipient re-opens or otherwise refreshes the e-mail message. By contrast, if the system 250 implements the "open connection" method, the system 250 may determine what frames to send in real time or in near-real time, and the offers and/or advertisements displayed to or available to the recipient may change with time, even if the recipient does not re-open or otherwise refresh the e-mail message.

In some embodiments, the system 250 may transmit the multi-frame image using the "open connection" method, but may send each frame twice with little or no delay between the two copies of the frame. Doing so addresses a potential issue that arises because some e-mail clients, such as web browsers and those used via a web browser (e.g., Yahoo, Gmail, etc.), may wait to display a frame until the client receives the next frame. In the case where the system 250 transmits the frames one by one, the system 250 may transmit two copies of each frame with no delay between each, as a way of guaranteeing that the client displays each frame immediately instead of waiting to receive the next frame. Alternatively, the system 250 may transmit at least an initial portion of the next frame with no intervening delay as a way of guaranteeing that the client displays the frame immediately.

Figure 9A:
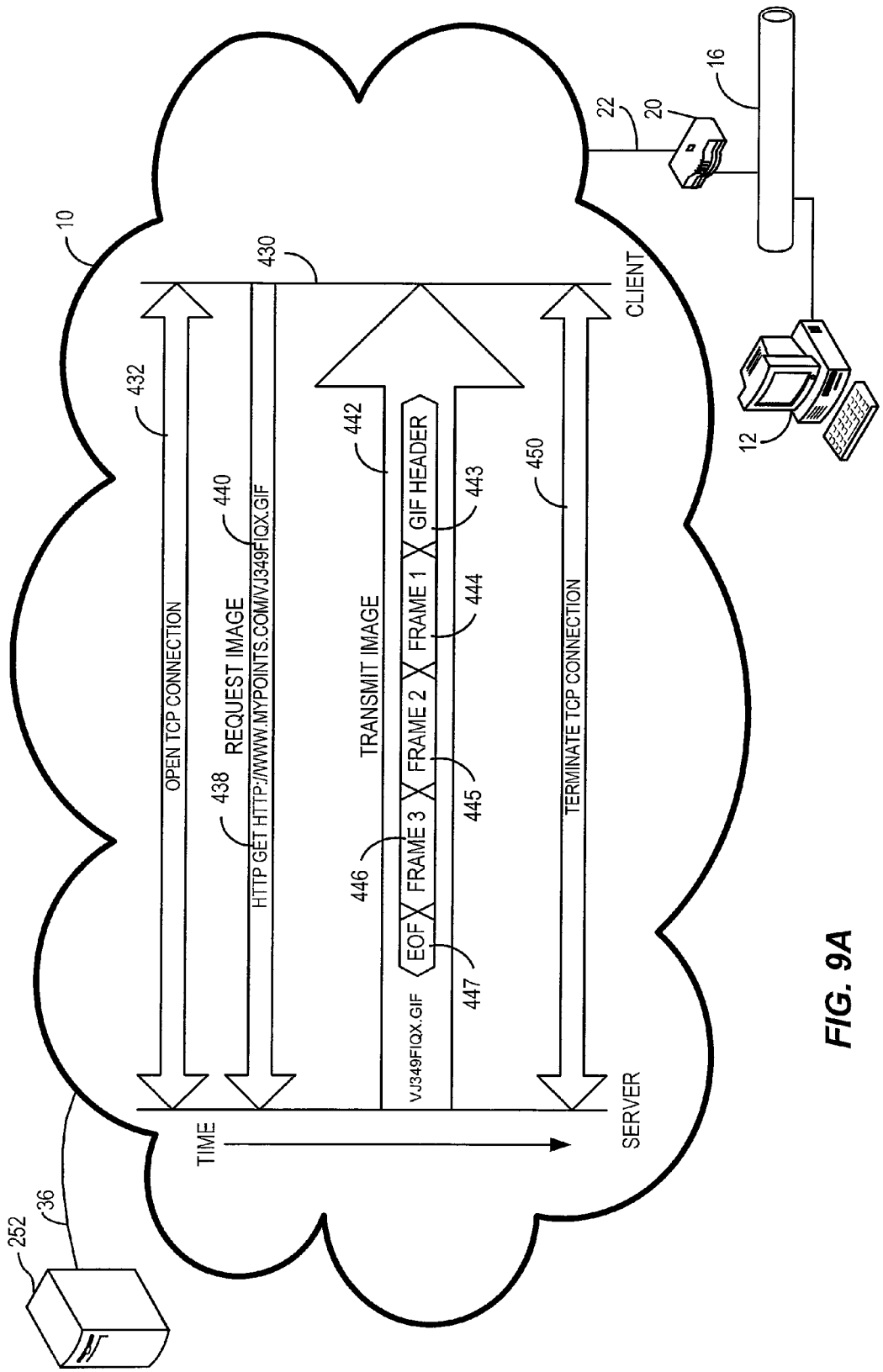
FIG. 9A depicts an exemplary TCP connection and image data transmitted in accordance with some embodiments compatible with the method depicted in FIG. 8.
Figure 9B:
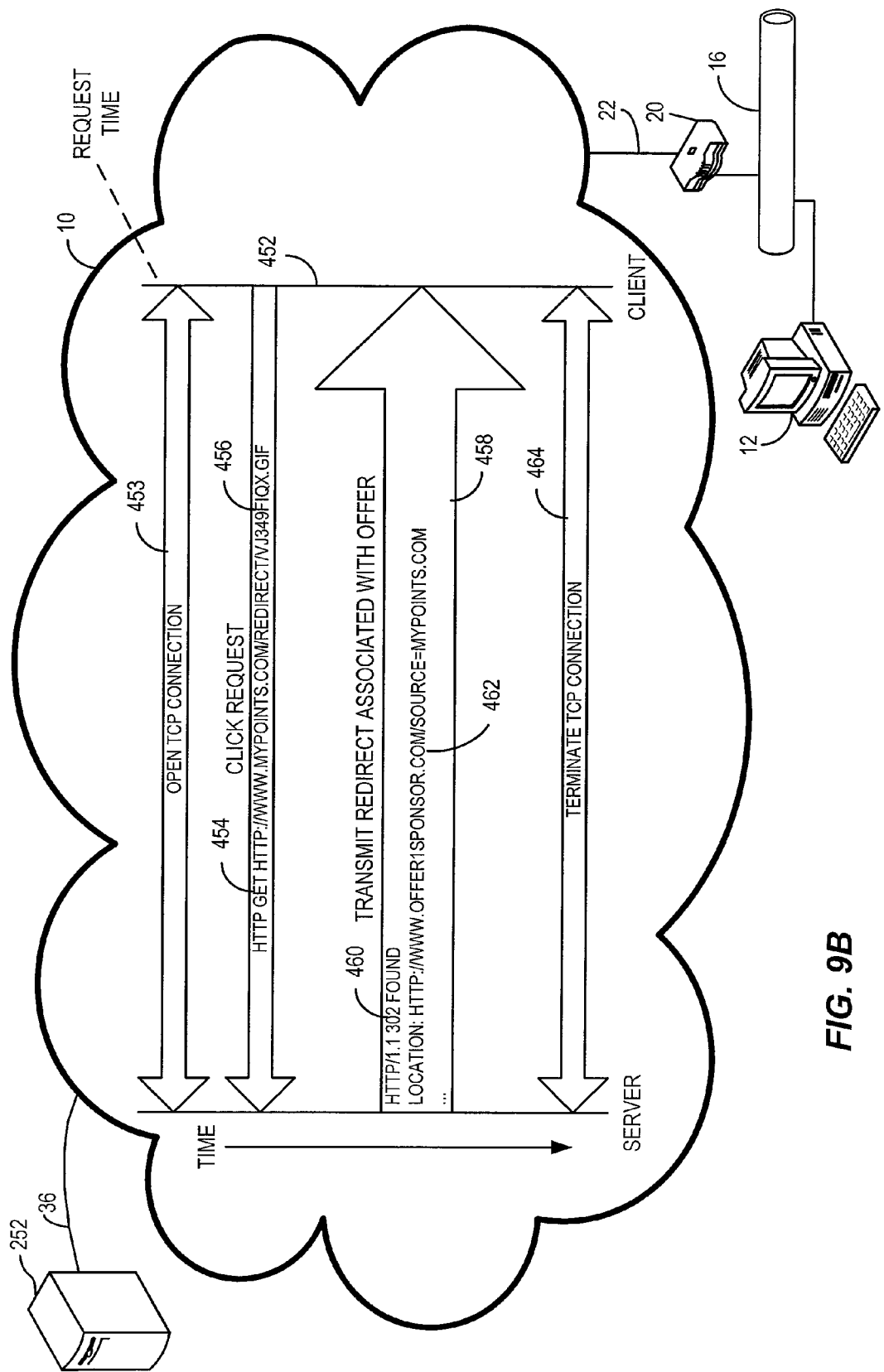
FIG. 9B depicts an exemplary TCP connection and response data transmitted in accordance with some embodiments compatible with the method depicted in FIG. 8.

FIGS. 9A-9D depict a series of exemplary TCP connections, which connections may be used to transmit/receive data between the system 250 (e.g., at the server 252) and a computer associated with the recipient (e.g., at the PC 12). In particular, FIGS. 9A and 9B depict exemplary data transmissions in accordance with an implementation of the method of FIG. 8 that employs the closed connection method described above. The PC 12 and the server 252, employing known TCP handshake methods (illustrated as the double arrow 432), may establish a first TCP connection 430 (FIG. 9A) when the recipient opens the e-mail message. After the TCP connection 430 is established, the PC 12 and, in particular, the e-mail client operating on the PC 12, may transmit to the server 252 a request 438 for the image. Of course, the request 438 may include an identifier 440. After receiving the request 438 for the image (at the block 402), the server 252 may transmit data 442 comprising a multi-frame image (at the block 412). The data 442 may, for example, include a GIF header 443, which may itself include information indicating that the GIF is an animated GIF, as well as information indicating the number of frames, the length of time to display each frame, whether to loop the sequence of frames, etc., as generally known. The data 442 may also include a plurality of frames, such as a first frame 444, a second frame 445, and a third frame 446. When the server 252 has transmitted all of the frames 444-446, the server 252 may transmit an end-of-file indicator 447. The server 252 and the PC 12, using known connection termination methods (illustrated as the double arrow 450) may close the TCP connection 430 after transmitting the data 442.

At some later time (e.g., any time after display of the first frame of the image), the recipient of the e-mail may click on the multi-frame image, indicating a response to an offer in one of the frames of the multi frame image. At this point, the PC 12 and the server 252 may establish a second TCP connection 452 (illustrated in FIG. 9B), employing known TCP handshake methods (illustrated as the double arrow 453), and transmit on the TCP connection 452 a click request 454, which may include an identifier 456, which may be the same as the identifier 440. After receiving the click request 454 (at the block 414), the server 252 may transmit a response 458 to the click request, such as a redirect command 460 (at the block 424 or 426) to cause a web browser associated with the PC 12 to navigate to a URI 462. While FIG. 9B depicts the response 458 as a redirect command 460 using the HTTP status code 302, any known method (e.g., manual redirect, Meta tag refresh, JavaScript redirect, frame redirect, etc.) of redirecting the web browser associated with the PC 12 to navigate to the URI 462 could be used. Of course, the response 458 need not redirect the recipient's web browser to a different URI. The response 458 may include any response, including, by way of example and not limitation, transmitting a web page, awarding points an account associated with the recipient, transferring other types of data to the PC 12, etc. After transmitting the response 458, the server 252 and the PC 12, using known connection termination methods (illustrated as the double arrow 464), may close the TCP connection 452.

Figure 9C:
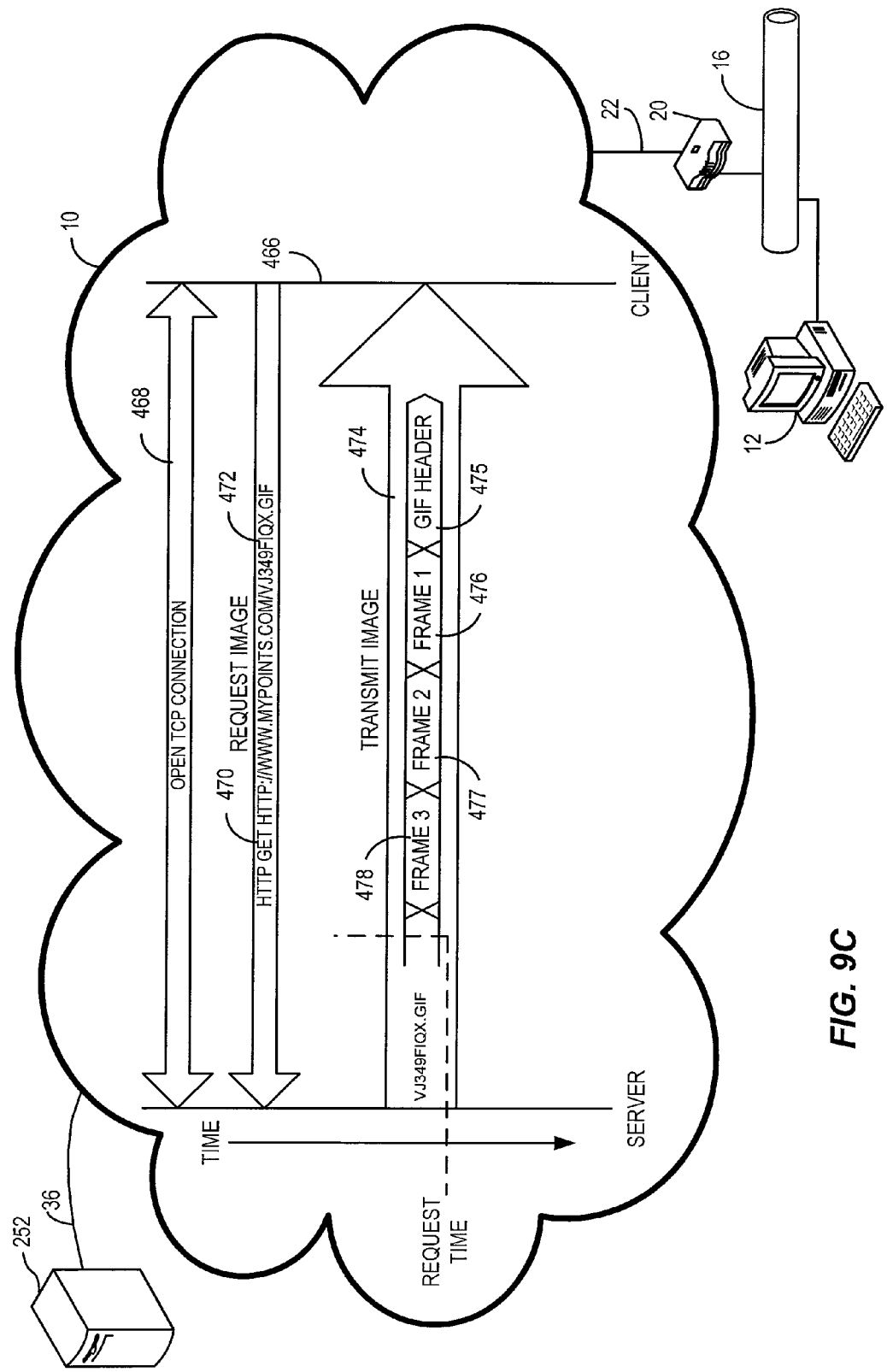
FIG. 9C depicts an exemplary TCP connection and image data transmitted in accordance with alternate embodiments compatible with the method depicted in FIG. 8.
Figure 9D:
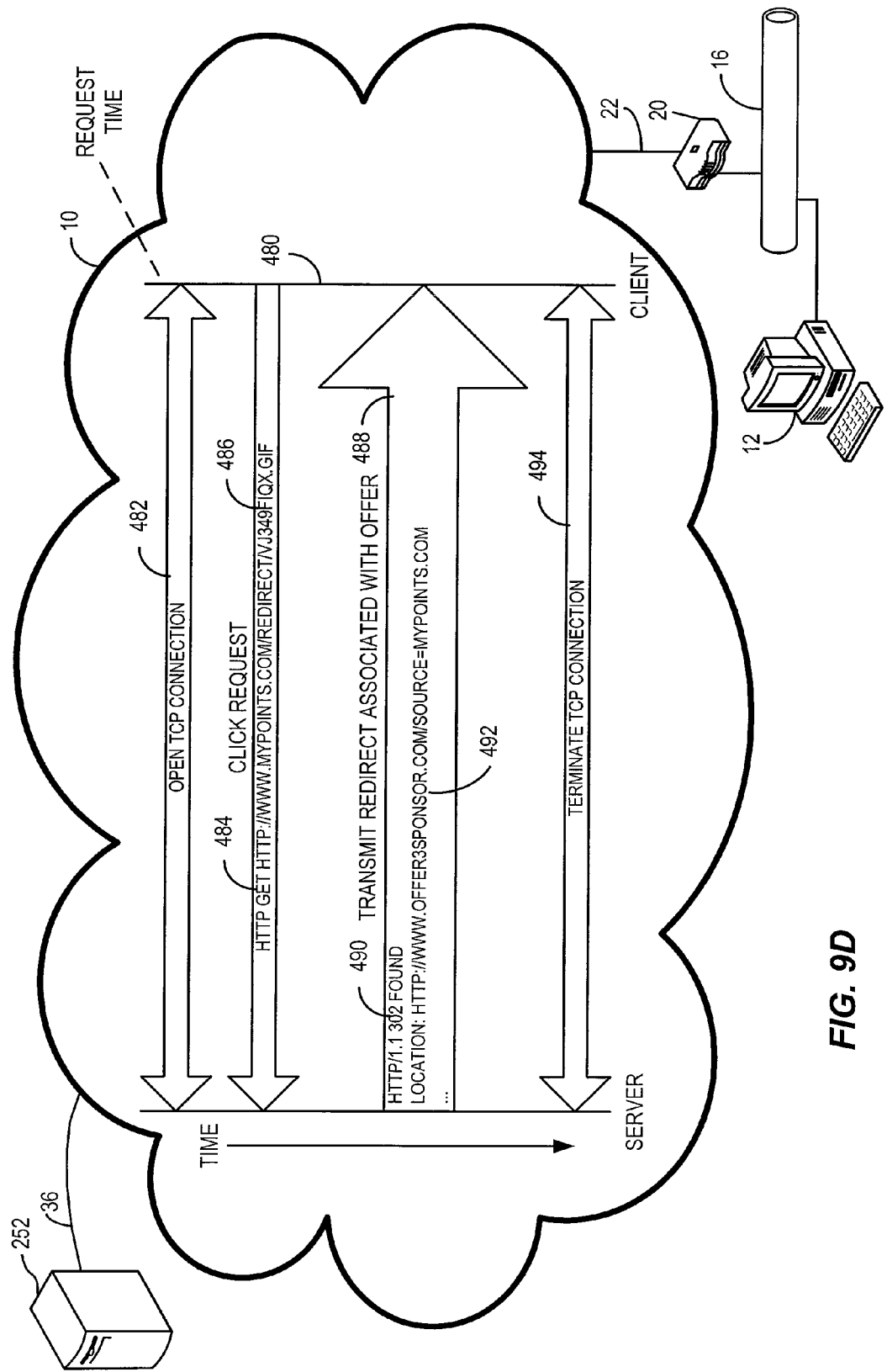
FIG. 9D depicts an exemplary TCP connection and response data transmitted in accordance with alternate embodiments compatible with the method depicted in FIG. 8.

FIGS. 9C and 9D depict an alternative series of exemplary TCP connections, which connections may be used to transmit/receive data between the system 250 (e.g., at the server 252) and a computer associated with the recipient (e.g., at the PC 12). In particular, FIGS. 9C and 9D depict exemplary data transmissions in accordance with an implementation of the method of FIG. 8 that employs the open connection method described above. The PC 12 and the server 252, employing known TCP handshake methods (illustrated as the double arrow 468), may establish a first TCP connection 466 (FIG. 9C) when the recipient opens the e-mail message, at which time the PC 12 and, in particular, the e-mail client operating on the PC 12, may transmit to the server 252 a request 470 for the image. Of course, the request 470 may include an identifier 472 but, as noted above, the identifier 472 is not strictly necessary. After receiving the request 470 for the image (at the block 402), the server 252 may transmit data 474 comprising a multi-frame image (at the block 412). The data 474 may, for example, include a GIF header 475, which may itself include information indicating that the GIF is an animated GIF, as well as indicating the length of time to display each frame, as generally known. The data 474 may also include a plurality of frames, such as a first frame 476, a second frame 477, and a third frame 478. Additional frames (not shown) may also be transmitted, as the server 252 may keep the TCP connection 464 open for as long as the server 252 determines there are additional frames to send, for as long as the recipient keeps the e-mail message open, etc. Thus, server 252 may continue to send data 474 for an indefinite period of time (e.g., seconds, minutes, hours, etc.).

At some time, indicated in FIG. 9C as "REQUEST TIME," the recipient of the e-mail may click on the multi-frame image, indicating a response to an offer in one of the frames of the multi-frame image. In the example depicted by FIG. 9C, the recipient clicks on the image after the transmission of the third frame 478 (i.e., presumably while the recipient is viewing the third frame 478). At this point, the PC 12 and the server 252 may establish a second TCP connection 480 (illustrated in FIG. 9D), employing known TCP handshake methods (illustrated as the double arrow 482), and transmit on the TCP connection 480 a click request 484, which may include an identifier 486, which may be the same as the identifier 472. After receiving the click request 484 (at the block 414), the server 252 may transmit a response 488 to the click request 484, such as a redirect command 490 (at the block 424 or 426) to cause a web browser associated with the PC 12 to navigate to a URI 492 (e.g., a URI associated with the offer displayed in the third frame). Of course, as described above, any method of redirection may be employed in the response 488 and, in fact, the response 488 need not redirect the recipients web browser to a different URI at all but, may instead include any response, as enumerated above with respect to FIG. 9B. After transmitting the response 488, the server 252 and the PC 12, using known connection termination methods (illustrated as the double arrow 494), may close the TCP connection 480.

Of course, those of ordinary skill in the art will recognize that the exemplary connections and data illustrated in FIGS. 9A-9D are but examples of data and TCP connections that may be implemented, and that the data depicted is merely pseudo-data (i.e., the data transmitted may be in a different format, have different content, etc.). Moreover, TCP connections are merely illustrative. For example, the PC 12 may leave open the TCP connection 430 in FIG. 9A and, after transmitting the image request 438, may request other images or data in the e-mail message.

Regardless of the method (i.e., open or closed) that system 250 implements to transmit the multi-frame image to the e-mail client, when the recipient sees an advertisement or an offer of interest, the recipient may "click" (e.g., by depressing a button on a pointing device such as on a mouse) on the displayed frame of the multi-frame image, which, as known, may cause a web browser to request the URI 293B (which includes the identifier 298B) specified by the link associated with the multi-frame image (i.e., may generate a "click request"). The system 250 receives the click request (block 414) and may, optionally, store the time at which the system 250 received the click request (block 416).

Figure 10A:
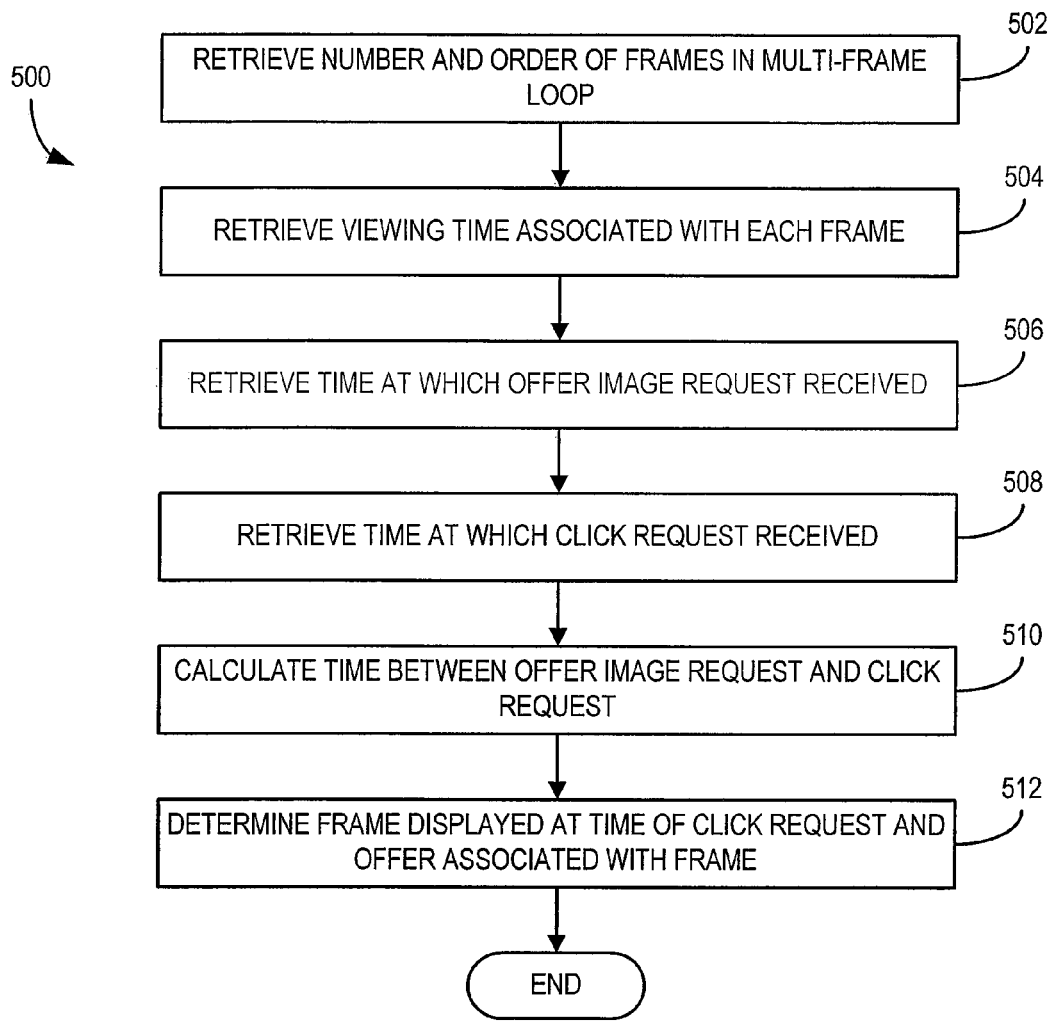
FIG. 10A depicts a flowchart illustrating an exemplary method of determining a frame viewed by a recipient when the recipient generates a click request in accordance with one or more of the presently described embodiments.
Figure 10B:
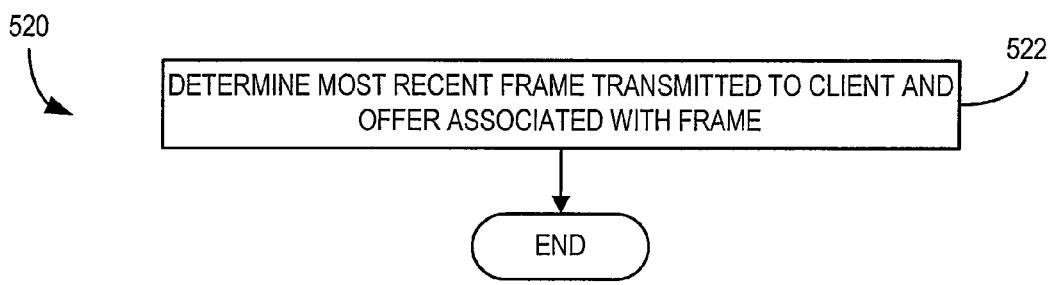
FIG. 10B depicts a flowchart illustrating an alternate exemplary method of determining a frame viewed by a recipient when the recipient generates a click request in accordance with one or more of the presently described embodiments.

The system 250 may then proceed to determine what advertisement or offer (i.e., which frame of the multi-frame image) the recipient was viewing when the recipient clicked on the multi-frame image (block 418). The method used to determine the offer or advertisement displayed to the recipient when the recipient clicked on the multi-frame image depends on the method by which the system 250 transmits the multi-frame image to the recipient's client. FIGS. 10A and 10B, respectively, illustrate two exemplary methods 500, 520 of making the determination. The system 250 may use the method 500, for example, where the system 250 transmits the multi-frame image using the closed connection method described above. The method 500 depends on recording the time that the system 250 transmits the first frame of the multi-frame image, so that the system 250 can determine the timing of the remainder of the frames relative to that of the first frame, using the knowledge of the pre-determined time delays between the frames and whether the sequence of the frames in the multi-frame image is set to "loop" when the sequence is complete (i.e., when the e-mail client has displayed all of the frames) or to stay frozen on the final frame. Alternatively, the system 250 may use the method 520 where the system 250 transmits the multi-frame image using the open connection method described above. The method 520 does not require knowledge of the time at which the system 250 transmits first frame of the multi-frame image.

Figure 11:
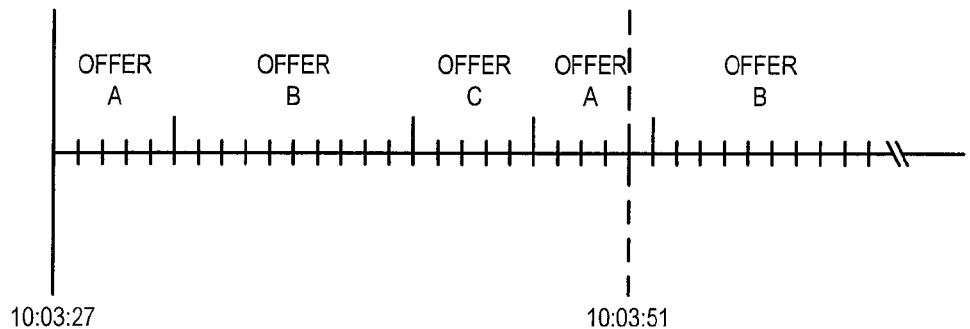
FIG. 11 illustrates an exemplary collection of offers and frames that may be displayed to a recipient in accordance with one or more of the presently described embodiments.

If the system 250 implements the closed connection method to transmit the multi-frame image, the system 250 may retrieve (e.g., from a memory such as the memory 52) information related to the multi-frame image transmitted. For example, the system 250 may retrieve the number and order of offers (which may correspond to the number of frames) in the multi-frame image (block 502) (which frames may be "looped"), may retrieve a viewing time associated with each of the frames in the multi-frame image (block 504), may retrieve the time at which the system 250 received the offer image request (block 506), stored at the block 404, and may retrieve the time at which the system 250 received the click request (block 508), stored at the block 416. With the retrieved information, the system 250 may calculate the elapsed time between the image request (and/or any request for a static image) and the click request (block 510) to determine which frame was displayed to the recipient when the recipient clicked on the multi-frame image (block 512) causing the recipient's computer to generate the click request. For example, and with reference to FIG. 11, assume a multi-frame image transmitted to a recipient's client (at the block 412) included offers A, B, and C, and that the multi-frame image displayed the frames for each of the offers A, B, and C for 5, 10, and 5 seconds, respectively. If the information stored at the block 404 indicates that the system 250 received an offer image request for an e-mail message with an identifier VJ349FIXQ at 10:03:27 AM, and the information stored at the block 416 indicates that the system 250 received a click request having the same identifier VJ349FIXQ at 10:03:51 AM, the system 250 may determine (at the block 510) that 24 seconds elapsed between the offer image request and the click request, and, therefore, may determine (at the block 512) that the recipient was viewing offer A (24 seconds after the recipient first started viewing the multi-frame image) when the recipient clicked on the multi-frame image.

Alternatively, if the system 250 implements the open connection method to transmit the multi-frame image, the system 250 may determine the offer displayed to the recipient when the recipient clicked on the multi-frame image by determining the offer associated with the most recent frame transmitted (block 522). For example, if the system 250 transmits a frame associated with an offer A, waits 5 seconds, transmits a frame associated with an offer B, and two seconds later (before the system 250 transmits another frame) receives a click request, the system 250 may determine that the recipient was viewing the frame associated with the offer B when the recipient clicked on the multi-frame image.

In any event, after the system 250 determines, at the block 418, the frame displayed to the recipient when the recipient clicked on the multi-frame image, the system 250 may, optionally, determine whether the recipient clicked on the multi-frame image within a pre-determined window of time before or after the display of a new frame (block 422). For example, it is well known that there is a perceptual delay of approximately 500 milliseconds between the time at which an image changes and the time at which a viewer realizes the image has changed. Thus, it is possible that the recipient of the e-mail message may click on the multi-frame image just as the image changes to display a frame associated with a new offer (e.g., an offer B), intending to click on the previous frame associated with the previous offer (e.g., an offer A). The system 250 may determine at the block 422 that the system 250 received the click request within a pre-determined time (e.g., 1 second) after the display of the new frame (e.g., the frame associated with the offer B).

If the system 250 determines that it received the click request within the pre-determined time after the display of a current frame associated with a new offer, the system 250 may determine that the recipient selected the previous frame and take an action associated with the offer associated with the previous frame, such as directing the recipient's web browser to a web page associated with the offer associated with the previous frame (block 424). Alternatively, if the system 250 determines that it did not receive the click request within the pre-determined time after the display of the current frame, the system 250 may determine that the recipient selected the currently-displayed frame and may take an action associated with the offer associated with the current frame, such as directing the recipient's browser to a web page associated with the offer associated with the currently-displayed frame (block 426). In some embodiments, the system 250, upon receiving a click request with a pre-determined time period (e.g., 500 milliseconds) of the display of a new frame, may direct the recipient's web browser to a web page that shows both the previous and current offers and allows the recipient to confirm the offer to which the click request was intended to indicate a response.

In some embodiments, two or more consecutive frames in the multi-frame image may relate to the same offer and/or advertisement. For example, the multi-frame image may include a plurality of sequential frames that together form a small animated series, and the series of frames may relate to a single offer. In these embodiments, the system 250 need not evaluate whether or not the system 250 received the click request within a pre-determined window of time after the display of a new frame (the block 422) if the new frame is associated with the same offer as the previous frame. Thus, in these embodiments the system 250 may first evaluate whether a new frame is associated with a different offer than the previous frame and, if so, may then evaluate whether or not the system 250 received the click request within a pre-determined window of time after the display of a new frame. Of course, the method 400 remains effective even when performed as depicted, despite the presence of consecutive frames related to the same offer, because each consecutive frame remains associated with the respective offer and the system 250 will associate the click request with that offer.

Figure 12:
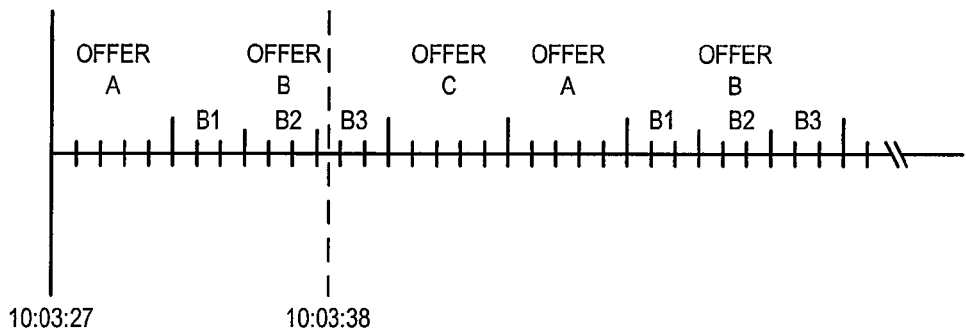
FIG. 12 illustrates an alternate exemplary collection of offers and frames that may be displayed to a recipient in accordance with one or more of the presently described embodiments.

FIG. 12 depicts an exemplary series of frames A, B1, B2, B3, and C transmitted to an e-mail client as a multi-frame image, illustrating one example of a multi-frame image having a plurality of consecutive frames related to a single offer. In the example depicted by FIG. 12, frame A relates to a first offer ("Offer A"), each of frames B1, B2, and B3 relates to a second offer ("Offer B"), and frame C relates to a third offer ("Offer C"). If the system 250 receives within a one-second window after sending frame B3 (or after the e-mail client would have displayed frame B3 if the system 250 transmitted the multi-frame image using the "closed connection" method) a click request having the same identifier as the image request (e.g., VJ349FIXQ), the system 250 may associate the click request with offer B regardless of whether or not the system 250 received the click request within the pre-determined window of time after display of the new frame (i.e., they system 250 would associate the click request with image B2 or with image B3 but, in any event, with offer B). In fact, in some embodiments, the system 250 may associate the click request with offer B regardless of whether the system 250 even evaluated whether the system 250 received the click request within the pre-determined window of time (the block 422), because the system 250 knows that each of the series of frames is associated with offer B.

Figure 13:
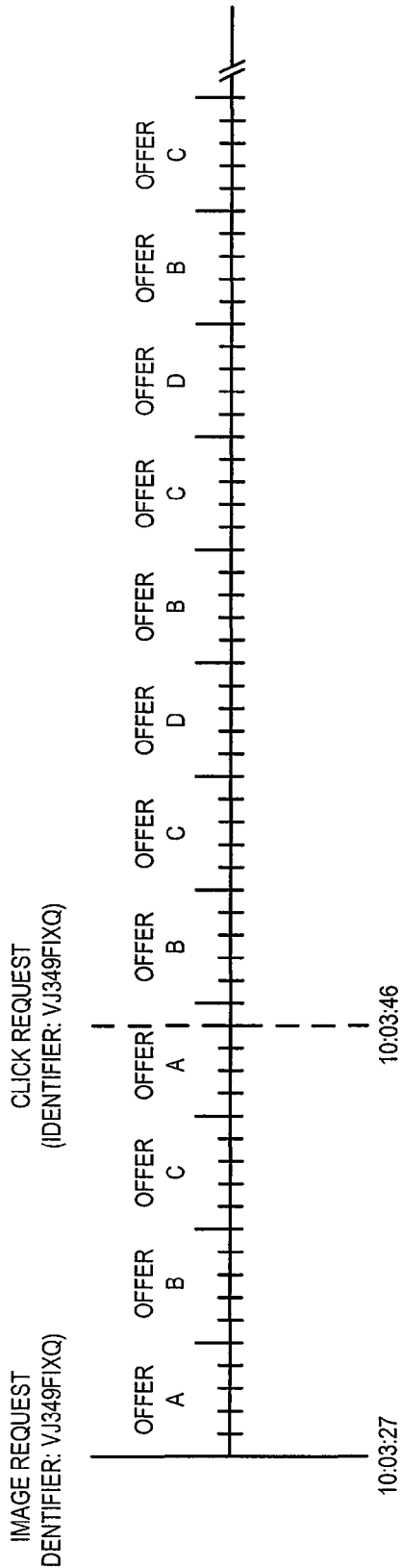
FIG. 13 illustrates another alternate exemplary collection of offers and frames that may be displayed to a recipient in accordance with one or more of the presently described embodiments.

A number of embodiments exist in which a proprietor may take advantage of variations of the methods and system described above. In one embodiment, for example, the system 250 transmits the multi-frame image using the "open connection" method. The system 250 may vary the offers presented to the recipient (i.e., may vary the frames transmitted to the e-mail client) according to various criteria. In one example, once the recipient has responded to an offer, the frame or frames associated with that offer may be suppressed and/or one or more other offers may be included (see FIG. 13). In another example, the system 250 may insert a special offer (e.g., an "instant win" offer) at a particular time (e.g., 3:30 PM), which offer is announced in the text of the e-mail message to encourage the recipient to view the e-mail message at that particular time. In yet another example, the system 250 may insert a special offer after the recipient has responded to a pre-determined number of offers in a particular session. In still another example, the system 250 may at times present real-time information to the recipient (e.g., a current number of points accrued).

Of course, even where the system 250 transmits the multi-frame image using the "closed connection" method, the system 250 may encourage a recipient to view an e-mail message at a particular time or for a particular length of time. The system 250 may insert special offers at random frame positions within a multi-frame image to encourage the recipient to open the e-mail message often, or may insert special offers late in a sequence of the frames of a multi-frame image to encourage the recipient to view all (or most) of the offers in a sequence before closing the e-mail message.

In some embodiments, the identifier 298B, in addition to indicating the recipient and/or the campaign with which the e-mail message is associated, may indicate a portion of the e-mail message with which to associate the click request. For example, an e-mail message may include multiple offer images (i.e., multiple multi-frame images), each having associated with it a unique identifier. In such instances, the identifier would also indicate to the system 250 the image within the e-mail message on which the recipient clicked to generate a click request.

Similarly, and as generally known, the HTML code may include image map tags. Simply put, this allows each of a number of discrete areas of an image to be associated with a different link URI. Thus, the identifier in the link URI received by the system 250, in addition to indicating the recipient and/or the campaign associated with the e-mail message, may indicate the area of the image on which the recipient clicked to generate a click request. Of course, in such an embodiment the identifier in the link URI may be different from the identifier in the image URI. For example, the identifier in the link URI may include appended characters indicating the region of the image map on which the recipient clicked, or the identifier in the link URI may be different from the identifier in the image URI, but associated in the system 250 with the identifier in the image URI. Notably, in embodiments implementing an image map, the same image map applies to all frames of the multi-frame image. Thus, if the image map specifies a top area of the multi-frame image having a first link URI with a first identifier, a middle area of the multi-frame image having a second link URI with a second identifier, and a bottom area of the multi-frame image having a third link URI with a third identifier, every frame of the multi-frame image will likewise have the top area, the middle area, and the bottom area (though the server may perform the same actions for more than one of the identifiers for the plurality of frames).

Figure 14A:
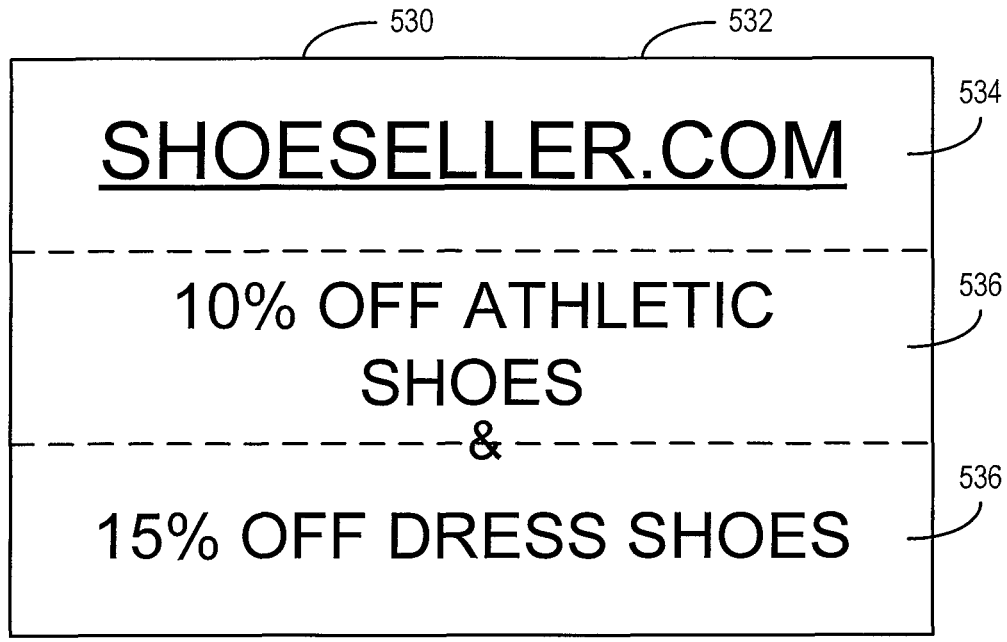
FIG. 14A depicts an exemplary first frame of a multi-frame image in an e-mail message employing an image map.
Figure 14B:
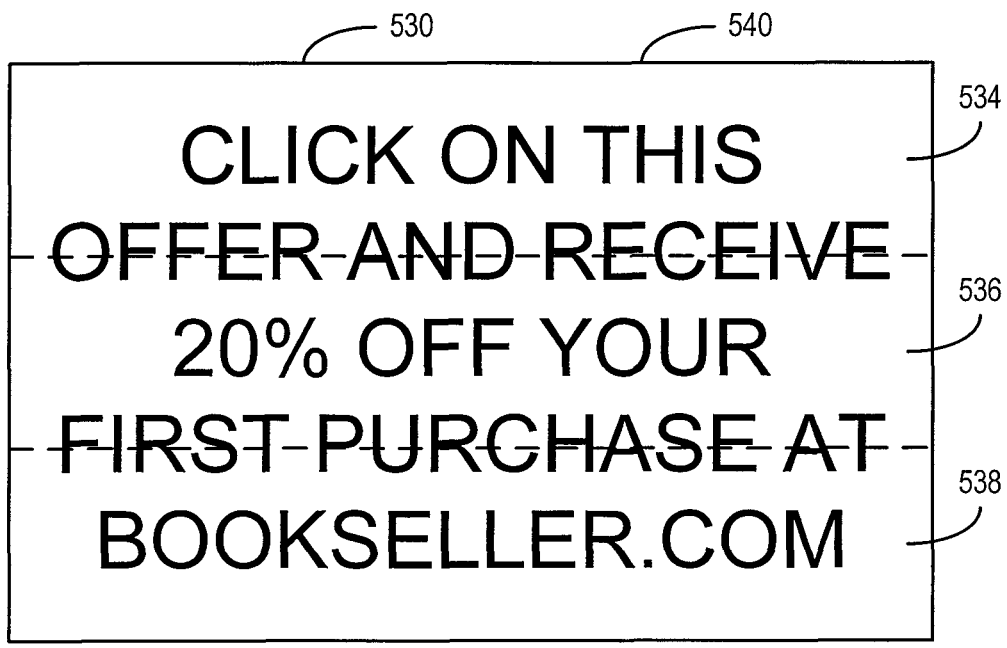
FIG. 14B depicts an exemplary second frame of the multi-frame image of FIG. 14A.

FIGS. 14A and 14B illustrate two exemplary frames 532, 540 that the system 250 may transmit as part of a multi-frame image 530 for which the HTML code specifies an image map. The image map specified by the HTML code for the multi-frame image 530 divides the multi-frame image into a top area 534, a middle area 536, and a bottom area 538. Each of the areas 534, 536, 538 may have an associated link URI 293B having a distinct identifier 298B, which distinct identifier the system 250 may associate with the respective area 534, 536, 538 in addition to the recipient and/or the campaign. For example, the image URI 295B for the multi-frame image 530 may include the identifier "PXUH756V" and the areas 534, 536, 538 may be associated with link URIs, respectively including identifiers "PXUH756V-1" "PXUH756V-2" "PXUH756V-3". The system 250 may know to associate the main portion of the identifier (i.e., "PXUH756V") with the recipient and/or the campaign, and may also know to associate the suffix of the identifier (i.e., "−1," "−2," or "−3") with the various areas of the image map. The main portion of the identifier may also indicate to the system 250 that the HTML code in the e-mail message implements the image map, so that the system 250 expects to receive a suffix. Alternatively, the distinct identifiers 298B included in each of the link URIs may all be completely different, and the system 250 may associate (e.g., in a table stored on the system 250) each of the link URIs with the image URI.

In any event, FIG. 14A depicts a first frame 532 of the multi-frame image 530, which frame 532 takes advantage of the image map specified by the HTML code in the e-mail message. In the frame 532, the system 250 may receive a click request including a first identifier (e.g., "PXUH756V-1") and may direct the recipient's web browser to a main website for the retailer associated with the offer when the recipient clicks in the top area 534 of the frame 532. If the recipient clicks in the middle area 536 of the frame 532, the system 250 may receive a click request including a second identifier (e.g., "PXUH756V-2") and may direct the recipient's web browser to a specific page associated with an offer to receive a 10% discount on athletic shoes. Likewise, if the recipient clicks in the bottom area 538 of the frame 532, the system 250 may receive a click request including a third identifier (e.g., "PXUH756V-3") and may direct the recipient's web browser to a specific page associated with an offer to receive a 15% discount on dress shoes.

FIG. 14B depicts a second frame 540 of the multi-frame image 530, which frame 540 does not take advantage of the image map specified by the HTML code in the e-mail message, but which frame 540 is nevertheless subject to the specifications of the image map. That is, the frame 540 is still associated with three areas (each area having a different identifier in the link URI). However, in the frame 540, the system 250 may direct the recipient's web browser to a specific page associated with an offer to receive 20% off a purchase, regardless of which of the three identifiers the system 250 receives in the click request. Thus, the system 250 will direct the recipient's web browser to the same web page if the user clicks in the area 534 (and the system 250 receives the identifier "PXUH756V-1") or in the area 536 (and the system 250 receives the identifier "PXUH756V-2").

Of course, the system 250 could also transmit a multi-frame image having only a single frame, the single frame having two or more offers (which offers could be for different, unrelated merchants). For example, the system 250 could construct the single frame by combining images for two or more offers into a single frame, and having knowledge of HTML code in the e-mail message that associates the various geometrical areas of the multi-frame image with the appropriate link URIs. Thus, in some embodiments, the entire e-mail message may comprise a single large multi-frame image, the content of which image varies from time to time. The image may have clickable areas, defined by image map tags in the HTML code, and each clickable area may have an offer personalized (e.g., depending on the identity of the recipient and/or the e-mail message).

Further still, because some multi-frame image formats (e.g., the animated GIF format) allow a new frame to replace only a portion of the multi-frame image, multi-frame image may, with each new frame, update only a portion of the displayed image. For example, if the entire multi-frame image is associated with a single URI (i.e., image map tags are not implemented), some portions of the image may vary while other portions of the image may remain static. Alternatively, if the HTML code associated with a multi-frame image implements image map tags, the system 250 may update individual offers within the image rendered by the e-mail client.

As described above, in some embodiments, the system 250 may make allowances for network delays. The system 250 may compute the network delay by, for example, examining the time required to serve images when the recipient opens the e-mail message. Knowing the network delay (also called the network latency), the system 250 may shift the expected viewing times of the frames in the multi-frame image by the network latency, and may, additionally or alternatively, shift the time associated with the received click request by the network latency. Shifting the click request and/or the expected viewing times of the frames in the multi-frame image may provide greater accuracy in allowing the system 250 to determine which frame was displayed to the recipient by the e-mail client when the recipient clicked on the multi-frame image. The system 250 may determine the network latency, for example, by measuring for a static image the amount of time it takes the e-mail client to retrieve the image before either the request for the next image on the same connection or the time until the connection is closed (indicating that the e-mail client has completed the retrieval of the static image). In this manner, the system 250 may determine how long it takes to transmit a given quantity of image data to the e-mail client which may be physically distant (geographically or with respect to the particular network path taken by the data) from the system 250, or may have a slow connection (e.g., a dial-up connection). This determination may allow the system 250 to optimize the delay between the frames of the multi-frame image and/or to more-accurately determine the frame displayed by the e-mail client when the recipient generates a click request. Of course, this necessarily implies that the e-mail message have, in addition to the multi-frame image and the associated link, at least one static image if the open-connection method is employed. The static image may be, for example, a 1×1 clear pixel web beacon, a logo associated with the advertising system or an advertiser, etc., which may be associated with the multi-frame image by virtue of having the same identifier or using the same cookie. Of course, if the closed-connection method is employed, the multi-frame image and the associated link will suffice. Those of ordinary skill in the art will appreciate that the term "network delay," and the method described herein by which network delay is measured, is a measure of the time of preparing, transmitting, receiving, and decoding a request or a response and, as such, includes both network transmission times as well as processing time on both the client and servers.

It will be apparent to those of ordinary skill in the art that instances may occur in which the system 250 determines (e.g., at the block 418) that the recipient was viewing one frame of a multi-frame image when, in fact, the recipient was actually viewing another frame of the multi-frame image. This may occur, by way of example, when a recipient views the e-mail message in a dedicated client such as Microsoft Outlook and, upon clicking on a frame of the image, the recipient's computer must open a web browser to send the request to the system 250, causing a delay between the time that the user clicks on the frame and the time the system 250 receives the request. This system 250 may detect this situation, in some circumstances, by using the HTTP "user agent" string to determine the client that makes a particular request. To address these instances, the system 250 may, upon receiving the first click request, redirect the user's browser to a general landing page which contains, for example, all offers relevant for the multi-frame image or for the e-mail.

Those of ordinary skill in the art will also appreciate that an action performed in response to a click request associated with a particular offer may be any number of actions. Generally, the click request will take the form of an HTTP GET request as is known. Thus, when the recipient clicks on a multi-frame image having a link URI (e.g., "http://www.mypoints.com/ClickRequest/PXUH756V"), the recipients e-mail client may send an HTTP GET request including that link URI. The system 250 may receive the HTTP GET request and may identify the frame (and offer) that the recipient was viewing when they clicked on the multi-frame image, and may determine to what URI to send the recipient's browser. The response from the system 250 may then comprise an HTTP REDIRECT to the URI determined by the system 250 (e.g., "http://www.shoeseller.com/source=mypoints.com"). Alternatively, the response from the system 250 may comprise a web page tailored for the recipient and the offer to which the recipient responded. For example, the web page may include another link which can take the recipient to a web page associated with the offer, or the web page may allow a transaction to be carried out entirely on the system 250. Of course, the response of the system 250 to the HTTP GET request could be any customized response available in HTML, including by way of example and not limitation, opening a video stream, downloading content to the recipient's computer, creating an automated connection through a chat session with a remote support person, etc.

Moreover, the click request need not take the form of an HTTP GET request, but may instead (or additionally) make use of any scheme available for use within a URI, including such schemes as mailto, news, telnet, ftp, http, https, etc. For example, the link URI (e.g., "ftp://ftp.mypoints.com/ClickRequest/PXUH756V.pdf") may cause the e-mail client to establish a connection to the system 250 (e.g., ftp.mypoints.com) using File Transfer Protocol (FTP) and to download a coupon document (e.g., PXUH756V.pdf) determined by the system 250 upon receipt of the FTP request having the identifier (e.g., PXUH756V).

Those of ordinary skill in the art will also appreciate that if an ISP or an e-mail client saves (i.e., caches) the multi-frame image, the presently-described methods may not function as desired. Therefore, the system 250 may implement well-known techniques to assure that this does not happen. One such technique, for example, involves indicating in the HTTP headers for the response that transmits the multi-frame image to the e-mail client that the ISP/e-mail client should not use a cached image.

While the present disclosure describes the embodiments herein with reference to e-mail messages, a proprietor may also apply these methods on a web page. While most web pages do not share with e-mail messaging the same limitations that make these methods particularly useful in the field of e-mail messaging, the methods are nevertheless effective in the realm of the World Wide Web with minor changes. In particular, instead of an identifier associated with a recipient-specific e-mail message, the system 250 may, as described above, rely on a browser cookie to identify the user associated with the multi-frame image request and/or the click request.

In either the realm of the World Wide Web or the realm of e-mail messaging, the methods described above present opportunities for a proprietor to direct advertising or delivery of information to specific users. For example, when a user of an online auction web site places a bid on an item, the web site may present to the user a multi-frame image in accordance with the methods herein. The multi-frame image may show the user other auction items from the same seller, other items similar to the item on which the user placed a bid, etc. Further, the multi-frame image may include occasional "status" frames, which may present real-time or near-real-time information and indicate to the user the status of the current bid (e.g., whether the user is currently the high bidder, how much time remains before the close of the auction, etc.) or other information of interest to the user. Similarly, a confirmation e-mail message transmitted to a user who bids on an auction item may include a multi-frame image and the system may transmit similar (or even the same) frames as those transmitted and displayed to the user on the web site.

Although the foregoing text sets forth a detailed description of numerous different embodiments, it should be understood that the scope of protection is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

We claim:

1. A method of sending, via e-mail, content to which a recipient may respond, the method executed by a system comprising one or more servers, each server comprising a processor and a memory storing machine readable instructions executable to cause one or more of the processors to perform the method, the method comprising:
   transmitting, from a server, an electronic mail (e-mail) message to a recipient, the e-mail message including:
      a first uniform resource identifier (URI) for specifying to an e-mail client associated with the recipient a location from which to request an image to display within the e-mail message; and
      a second URI for specifying to either the e-mail client or a browser client associated with the recipient a location from which to request data when the recipient selects the image displayed within the e-mail message;
   receiving, at the server, from the e-mail client a first request, the first request for the image specified by the first URI;
   interpreting, at the server, the received first request to determine a plurality of frames to transmit as an image in a multi-frame image format in response to the first request, the plurality of frames to be sequentially displayed by the e-mail client;
   transmitting, from the server, the image to the e-mail client in response to the first request, the plurality of frames to be displayed to the recipient by the e-mail client;
   receiving, at the server, a second request, the second request for data associated with the second URI, the second request indicating that the recipient selected the image;
   determining, at the server, one of the plurality of frames that was displayed to the recipient when the recipient selected the image to cause the second request;
   performing, at the server, an action in response to the determination of the one of the plurality of frames displayed to the recipient when the recipient selected the image.

2. The method of claim 1, wherein each of the first URI and the second URI includes an identifier, and further comprising interpreting the identifiers to determine from the identifiers the message that caused the first request to be transmitted.

3. The method of claim 2, wherein:
   the identifier is associated with one or both of the recipient and a marketing campaign; and
   interpreting the identifier comprises determining the one or both of the recipient and the marketing campaign with which the identifier is associated.

4. The method of claim 2, wherein the identifier comprises a value determined by first information associated with the recipient and second information associated with a marketing campaign.

5. The method of claim 2, wherein the identifier is an encrypted value.

6. The method of claim 2, wherein the identifier comprises a lookup value associated with a table or a database, the table or the database comprising at least information associated with the recipient and information associated with a marketing campaign.

7. The method of claim 6, wherein the lookup value is randomly generated.

8. The method of claim 2, wherein the identifier comprises a browser cookie.

9. The method of claim 1, wherein transmitting the image further comprises:
   transmitting an indication to the e-mail client that the server is sending a plurality of frames; and
   transmitting the plurality of frames.

10. The method of claim 9, wherein transmitting an indication to the e-mail client that the server is sending a plurality of frames comprises transmitting an indication to the client that the server is sending an animated GIF file.

11. The method of claim 10, wherein transmitting the image further comprises transmitting the animated GIF file comprising the plurality of frames, wherein the plurality of frames have a known sequence, and wherein each of the plurality of frames is displayed for a known period of time.

12. The method of claim 11, wherein transmitting each frame comprises either transmitting each frame two times with no intervening delay or transmitting an initial portion of a subsequent frame with no intervening delay.

13. The method of claim 11, further comprising:
determining a time when the recipient opens the e-mail message; and
determining a time when the recipient selected the one of the frames; and
wherein determining the one of the plurality of frames displayed to the recipient at the time the recipient selected the image comprises calculating a length of time that the e-mail message has been open.

14. The method of claim 13, wherein:
determining a time when the recipient opens the e-mail message comprises determining the time at which the server received the first request; and
determining a time when the recipient selected the one of the frames comprises determining the time at which the server received the second request.

15. The method of claim 13, wherein determining the one of the plurality of frames that was displayed to the recipient at the time the recipient selected the image comprises determining a last time of view for plurality of frames.

16. The method of claim 15, wherein determining a last time of view for plurality of frames comprises adjusting the last time of view by a pre-determined interval.

17. The method of claim 13, further comprising:
associating the received first request with either or both of a user agent and an IP address;
associating the received second request with either or both of the user agent and the IP address; and
matching the received first request with the received second request according to either or both of the user agent and the IP address.

18. The method of claim 9, wherein transmitting the plurality of frames comprises:
transmitting the plurality of frames through a first connection that remains open; and
identifying, at the server, each frame with the time of transmission.

19. The method of claim 18, wherein determining the one of the plurality of frames displayed to the recipient at the time the user selected the image comprises determining the most recent frame transmitted to the e-mail client.

20. The method of claim 18, wherein the server receives, while the first connection remains open, a third request identical to the first request, and wherein the server transmits in response to the third request the plurality of frames over a second connection that remains open.

21. The method of claim 20, wherein the server synchronizes the transmission of the plurality of frames such that the server transmits each frame at the same time through each of the first and second connections.

22. The method of claim 9, wherein transmitting the plurality of frames comprises either transmitting each of the plurality of frames twice with no intervening delay or transmitting after each of the plurality of frames an initial portion of a subsequent frame with no intervening delay.

23. The method of claim 9, wherein transmitting the image further comprises transmitting an image map associated with the image.

24. The method of claim 1, wherein performing one or more actions in response to the determination of the one of the plurality of frames displayed to the recipient at the time the recipient selected the image comprises at least one from the group consisting of:
recording a transaction associated with the recipient;
awarding the recipient with points;
transmitting information to the recipient;
initiating participation in a survey;
entering the recipient into a sweepstakes; and
redirecting a web browser associated with the recipient to a corresponding web site.

25. The method of claim 1, wherein:
a first server associated with a first entity transmits the e-mail message to the recipient; and
a second server associated with a second entity receives the second request and transmits the image.

26. A method of communicating with a recipient of an electronic mail (e-mail) message, the method executed on one or more computer processors, the method comprising:
transmitting the e-mail message from a server to the recipient, the e-mail message including:
a first uniform resource identifier (URI) specifying a location from which to request an image to display within the e-mail message; and
a second URI specifying a location from which to request data when the recipient selects the image displayed within the e-mail message;
receiving at the server a first request, the first request for the image specified by the first URI;
transmitting from the server, in response to the first request, an image in a multi-frame image format comprising a plurality of frames, each frame associated with particular information, and each of the plurality of frames displayed sequentially to the recipient;
receiving by the server a second request, the second request for data associated with the second URI, which second request indicates that the recipient has selected the image;
determining in the server which of the plurality of frames was displayed when the recipient selected the image; and
performing an action by the server based on the determination of which of the plurality of frames was displayed when the recipient selected the image.

27. The method of claim 26, wherein the first URI includes an identifier and the second URI includes an identifier.

28. The method of claim 26, wherein the particular information is associated with a plurality of sequentially-displayed frames.

29. The method of claim 26, further comprising selecting in the server which of a plurality of available frames to transmit in response to the first request, wherein each of the plurality of available frames is associated with one of a plurality of available offers or information pages.

30. The method of claim 29, wherein selecting which of a plurality of available frames to transmit comprises selecting the frames according to the particular information page or offer associated with each frame, and further selecting the frames according to one or both of information related to when the server receives the first request or demographic information associated with the recipient.

31. The method of claim 30, wherein the information related to when the server receives the first request comprises one or more of a time of day, a day of the week, and a date of the year.

32. The method of claim 30, wherein the demographic information associated with the recipient includes one or more of the recipient's gender, age, income, location, marital status, employment status, occupation, and favored activities.

33. The method of claim 30, wherein selecting which of a plurality of available frames to transmit comprises selecting, at a particular time, to send a particular frame.

34. The method of claim 29, wherein the selecting which of a plurality of available image frames to transmit comprises determining a general location of the recipient according to an Internet Protocol (IP) address from which the server receives the first request.

35. The method of claim 26, further comprising:
   determining in the server a round-trip latency parameter; and
   adjusting the determination of which of the plurality of frames was displayed when the recipient selected the image according to the latency parameter.

36. The method of claim 35, wherein the method of determining the round-trip latency parameter comprises determining calculating the difference between the sequential arrival times at the server of two image requests on the same network connection.

37. The method of claim 26, wherein determining in the server which of the plurality of frames was displayed at the time the recipient selected the image comprises:
   determining that the recipient selected the image within a predetermined quantity of time after either the transmission of a particular frame or a change to display a particular frame; and
   determining that the frame displayed at the time the recipient selected the image corresponds to the frame immediately prior to the particular image frame.

38. The method of claim 37, wherein determining in the server which of the plurality of frames was displayed at the time the recipient selected the image further comprises factoring in a human response time.

39. The method of claim 26, wherein transmitting from the server, in response to the first request, a plurality of frames, further comprises transmitting one or more incentive frames, each incentive frame associated with an incentive offer.

40. The method of claim 39, wherein performing an action in the server based on the determination of which of the plurality of frames was displayed at the time the recipient selected the image comprises awarding to the recipient, when the server determines that the frame displayed is an incentive frame, points associated with a loyalty program.

41. The method of claim 26, wherein transmitting from the server, in response to the first request, a plurality of image frames comprises:
   receiving at the server an identifier associated with the first request;
   interpreting in the server the identifier to identify one or both of a recipient of the e-mail message and a marketing campaign associated with the e-mail message; and
   selecting in the server which of a plurality of available image frames to transmit in response to the first request, wherein each of the plurality of available image frames is associated with one of a plurality of available offers, and wherein the server selects the image frames according to the one or both of the recipient of the e-mail message and the marketing campaign associated with the e-mail message.

42. The method of claim 26, wherein the e-mail message further comprises an image map associated with the image.

43. The method of claim 26, wherein receiving the first request further comprises receiving an identifier stored in a browser cookie associated with the first URI and second request further comprises receiving an identifier stored in a browser cookie associated with the second URI.

44. A method of presenting dynamic content, the method comprising:
   transmitting, from a server, hypertext markup language (HTML) code comprising:
      a first uniform resource identifier (URI) for specifying an image to display; and
      a second URI for specifying a location from which to request data when the image is selected by a user;
   receiving, at the server, a first request, the first request for the image specified by the first URI;
   transmitting, from the server, an image in response to the first request;
   receiving, at the server, a second request, the second request for data associated with the second URI;
   determining, at the server, a temporal relationship between the first request and the second request; and
   performing, at the server, one or more actions in response to the determined relationship.

45. The method of claim 44, wherein the image comprises a plurality of offers assembled into a single image.

46. The method of claim 45, wherein the image comprises a multi-frame image format.

47. The method of claim 46, wherein each of a plurality of frames transmitted in the multi-frame image format replaces one or more of the offers assembled into the single image.

48. The method of claim 44, wherein transmitting from the server HTML code comprises transmitting a web page.

49. The method of claim 44, wherein transmitting from the server HTML code comprises transmitting an HTML e-mail message.

* * * * *